United States Patent
Nishida et al.

(10) Patent No.: US 11,216,538 B2
(45) Date of Patent: Jan. 4, 2022

(54) MANAGEMENT SYSTEM, SERVER, MANAGEMENT METHOD, AND PROGRAM

(71) Applicant: Panasonic Intellectual Property Corporation of America, Torrance, CA (US)

(72) Inventors: Naohisa Nishida, Osaka (JP); Yuji Unagami, Osaka (JP); Junichiro Soeda, Nara (JP); Akira Tanaka, Osaka (JP); Fumiaki Kagaya, Miyagi (JP); Eiichi Abe, Miyagi (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 404 days.

(21) Appl. No.: 16/448,630

(22) Filed: Jun. 21, 2019

(65) Prior Publication Data
US 2019/0311090 A1    Oct. 10, 2019

(30) Foreign Application Priority Data

Jul. 4, 2018    (JP) .............................. JP2018-127771
Mar. 11, 2019    (JP) .............................. JP2019-044243

(51) Int. Cl.
*G06F 21/30*    (2013.01)
*G07C 9/00*    (2020.01)
(Continued)

(52) U.S. Cl.
CPC ....... *G06F 21/305* (2013.01); *G06Q 10/0836* (2013.01); *G07C 9/00571* (2013.01);
(Continued)

(58) Field of Classification Search
CPC ... H04W 12/08; G06Q 10/0836; G06Q 20/02; G06Q 20/223; G07F 17/12; G07F 17/10;
(Continued)

(56) References Cited

U.S. PATENT DOCUMENTS 7,876,465 B2 * 1/2011 Matsueda .............. G06Q 10/06
358/1.15
9,853,959 B1 * 12/2017 Kapczynski ............ G06F 21/62
(Continued)

OTHER PUBLICATIONS

Information and Communications Council, Information and Communications Policy Committee, IoT Policy Board Basic Strategy Working Group "Sub-working Group for Studying Blockchain Use Report" (URL:http://www.Soumu.go.jp/main_content/000496919.pdf) (with partial English translation).

*Primary Examiner* — Nam V Nguyen
(74) *Attorney, Agent, or Firm* — Wenderoth, Lind & Ponack, L.L.P.

(57) ABSTRACT

A management system includes: a right holder information storage unit which stores right holder information about a right holder entitled to use a delivery locker device; an agreement formation unit which creates a block of a blockchain that includes a processing instruction, and stores the block into a block storage unit; a terminal device which transmits an assignment processing instruction; a process execution unit which, when obtaining the assignment processing instruction included in the block, updates the current right holder included in the right holder information; and a condition checking unit which, when determining that the condition for assignment fails to be met, creates a return processing instruction and transmits the return processing instruction to the agreement formation unit. When obtaining the return processing instruction included in the block, the process execution unit updates the right holder information.

9 Claims, 21 Drawing Sheets

(51) Int. Cl.
  *H04L 9/32*      (2006.01)
  *H04W 12/08*     (2021.01)
  *G06Q 10/08*     (2012.01)
  *G07F 17/12*     (2006.01)

(52) U.S. Cl.
  CPC .............. *G07F 17/12* (2013.01); *G07F 17/13* (2020.05); *H04L 9/3236* (2013.01); *H04L 9/3297* (2013.01); *H04W 12/08* (2013.01); *H04L 2209/38* (2013.01); *H04L 2209/56* (2013.01)

(58) Field of Classification Search
  CPC ... G07F 17/13; H04L 9/3236; H04L 2209/56; H04L 2209/38; H04L 9/3239; H04L 9/3297; G06F 21/305; G07C 9/00571
  USPC .......................................................... 726/4
  See application file for complete search history.

(56) References Cited

U.S. PATENT DOCUMENTS

| | | | |
|---|---|---|---|
| 9,971,902 B2 * | 5/2018 | Lee | G06F 11/30 |
| 10,423,921 B2 * | 9/2019 | Wilkinson | G06Q 10/02 |
| 10,509,891 B2 * | 12/2019 | Solow | G06F 21/645 |
| 2015/0186840 A1 * | 7/2015 | Torres | G07F 17/12 |
| | | | 705/339 |
| 2016/0323109 A1 * | 11/2016 | McCoy | G06Q 20/1235 |
| 2018/0342036 A1 * | 11/2018 | Zachary | H04L 9/0637 |
| 2019/0019367 A1 * | 1/2019 | Unagami | H04L 9/3239 |

\* cited by examiner

FIG. 4A

{INSTRUCTION: "ASSIGNMENT", LOCKER NUMBER: 001, ASSIGNEE: "MR./MS. B", EXPIRED: 2018/01/25, SIGNATURE}

FIG. 4B

{INSTRUCTION: "ASSIGNMENT", LOCKER NUMBER: {001, 003, 011}, ASSIGNEE: "MR./MS. B", EXPIRED: 2018/01/25, SIGNATURE}

FIG. 5A

{INSTRUCTION: "UNLOCK", LOCKER NUMBER: 001, SIGNATURE}

FIG. 5B

{INSTRUCTION: "LOCK", LOCKER NUMBER: 001, SIGNATURE}

FIG. 6A

{INSTRUCTION: "RETURN", LOCKER NUMBER: 001, ASSIGNOR: "MR./MS. A", SIGNATURE}

FIG. 6B

{INSTRUCTION: "RETURN", LOCKER NUMBER: 002, ASSIGNOR: "ADMINISTRATOR", SIGNATURE}

FIG. 6C

{INSTRUCTION: "RETURN", LOCKER NUMBER: {001, 003, 011}, ASSIGNOR: "MR./MS. A", SIGNATURE}

FIG. 6D

{INSTRUCTION: "RETURN", LOCKER NUMBER: 005, ASSIGNOR: "MR./MS. A", "ADMINISTRATOR", SIGNATURE}

FIG. 10

| LOCKER NUMBER | RIGHT HOLDER AND EXPIRATION LIMIT | | |
|---|---|---|---|
| 001 | RIGHT HOLDER: MR./MS. C 2018/01/23 | RIGHT HOLDER: MR./MS. B 2018/01/23 | RIGHT HOLDER: MR./MS. A 2018/01/27 |
| 002 | RIGHT HOLDER: MR./MS. E 2018/01/25 | RIGHT HOLDER: MR./MS. D 2018/01/25 | |
| 003 | RIGHT HOLDER: MR./MS. F 2018/01/28 | | |

FIG. 11

| LOCKER NUMBER | RIGHT HOLDER AND EXPIRATION LIMIT | | |
|---|---|---|---|
| 001 | RIGHT HOLDER: MR./MS. C 2018/01/23 | ← RIGHT HOLDER: MR./MS. B 2018/01/23 | ← RIGHT HOLDER: MR./MS. A 2018/01/27 |
| 002 | RIGHT HOLDER: MR./MS. E 2018/01/25 | ← RIGHT HOLDER: MR./MS. D 2018/01/25 | |
| 003 | RIGHT HOLDER: MR./MS. G 2018/01/26 | ← RIGHT HOLDER: MR./MS. F 2018/01/28 | |

FIG. 12

| LOCKER NUMBER | RIGHT HOLDER AND EXPIRATION LIMIT | | |
|---|---|---|---|
| 001 | RIGHT HOLDER: MR./MS. B 2018/01/23 | → | RIGHT HOLDER: MR./MS. A 2018/01/27 |
| 002 | RIGHT HOLDER: MR./MS. E 2018/01/25 | → | RIGHT HOLDER: MR./MS. D 2018/01/25 |
| 003 | RIGHT HOLDER: MR./MS. F 2018/01/28 | | |

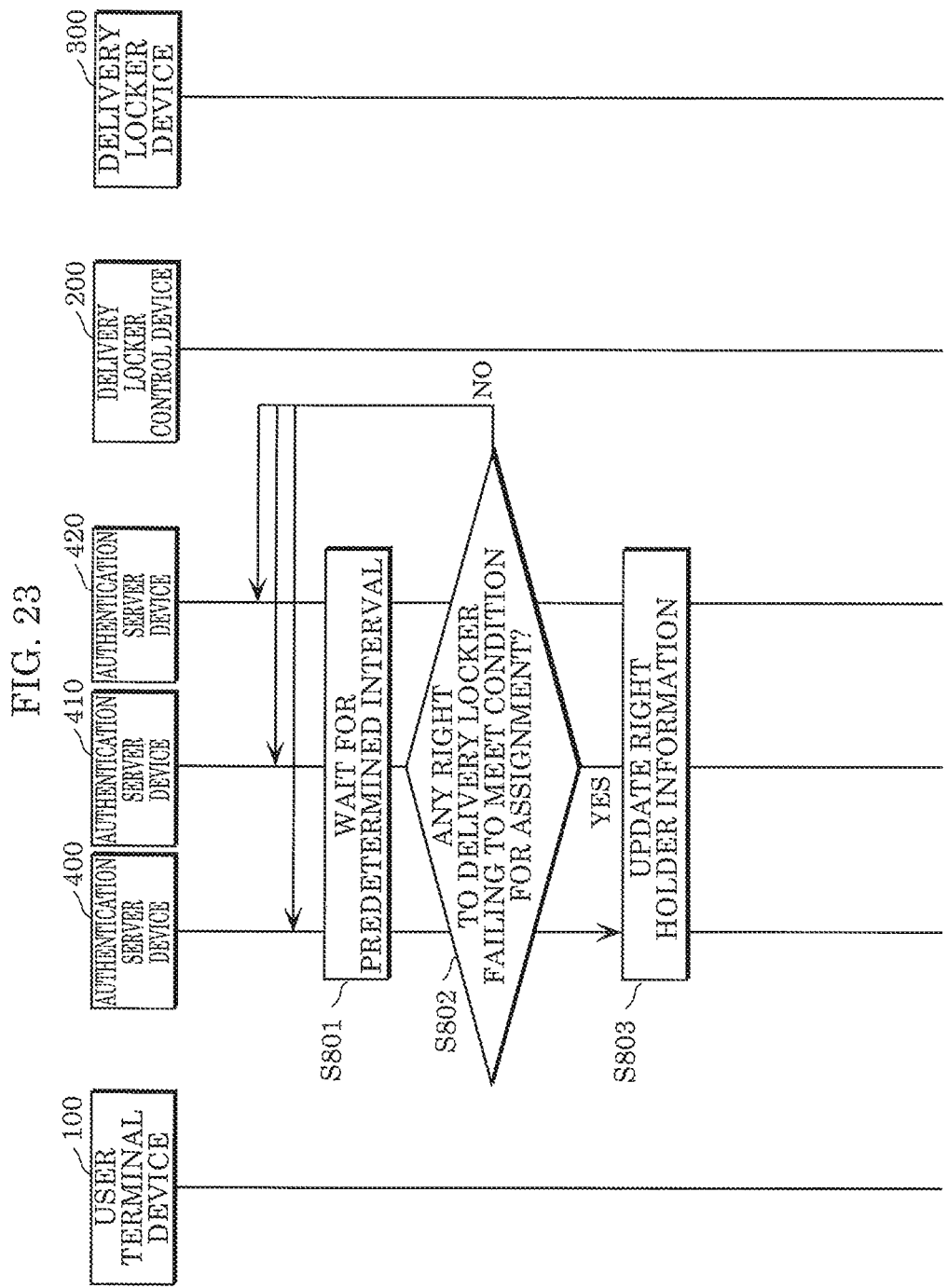

MANAGEMENT SYSTEM, SERVER, MANAGEMENT METHOD, AND PROGRAM

CROSS REFERENCE TO RELATED APPLICATIONS

This application claims the benefit of priority of Japanese Patent Application Number 2018-127771 filed on Jul. 4, 2018 and Japanese Patent Application Number 2019-044243 filed on Mar. 11, 2019, the entire contents of which are hereby incorporated by reference.

BACKGROUND

1. Technical Field

The present disclosure relates to management systems, servers, management methods, and recording media, and particularly relates to a management system, a server, a management method, and a recording medium which are used to manage a right that is managed using a blockchain.

2. Description of the Related Art

In recent years, systems for managing various rights using the blockchain technology have been proposed (for example, the Information and Communication Council, the Information Communication Policy Subcommittee, the IoT Policy Committee, the Basic Strategy Working Group, Summary from the Blockchain Utilization Research Sub-working Group [online] (searched on Jun. 25, 2018), Internet <URL: http://www.soumu.go/jp/main_content/000496919.pdf>). One of the application examples is delivery and receipt records using a delivery locker including one or more storage units. When unlocking records, etc., of the delivery locker are written and managed on blockchains, the fact of delivery and receipt of packages can be objectively verified without falsification. As a result, erroneous delivery or receipt can be prevented and, even if a problem occurs, an exact cause can be found.

Furthermore, for delivery locker systems using blockchains, managing a right of use which is the right to use a delivery locker by writing, on a blockchain, right holder information indicating a right holder entitled to use the delivery locker has been considered.

In this kind of delivery locker systems, the right of use is managed or exercised using a mechanism called a smart contract in which an arbitrary program can be executed. With this, it is possible to not only unlock a delivery locker, for example, but also easily execute complicated processes on a delivery locker.

SUMMARY

In this kind of delivery locker system, when a user receives a package, the user is supposed to request execution of the smart contract for completion of receipt and return the right of use of the delivery locker to the original right holder.

However, if a malicious user did not request the execution of this smart contract, this user would be able to continue to use the delivery locker wrongfully; thus, there is a problem in that such improper use cannot be prevented. Furthermore, even in the case where an innocent user leaves a package or is in a situation that makes it impossible to collect a package, the delivery locker would be unusable for a long period of time; thus, there is also a problem in that such improper usage cannot be prevented.

Therefore, the present disclosure is conceived in view of the above-described circumstances and has as an object to provide a management system, a server, a management method, and a recording medium which prevent improper use of a locker system including one or more storage units.

In order to achieve the aforementioned object, a management system according to an aspect of the present disclosure includes: a right holder information storage unit configured to store right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing; an agreement formation unit configured to create a block of a blockchain and store the block into a block storage unit, the block including a processing instruction; a terminal device which transmits, as one kind of the processing instruction, an assignment processing instruction including a condition for assignment of the right and user information indicating a second user to whom the right is assigned; a process execution unit configured to, when obtaining the assignment processing instruction as one kind of the processing instruction included in the block, update a current right holder included in the right holder information from the first user to the second user; and a condition checking unit configured to check whether the condition for assignment is met, and when determining that the condition for assignment fails to be met, create a return processing instruction for returning the right from the second user to the first user, and transmit the return processing instruction to the agreement formation unit. The process execution unit is configured to, when obtaining the return processing instruction as one kind of the processing instruction included in the block, update the second user included in the right holder information to the first user.

Note that the aforementioned general or specific aspects may be implemented using a device, a method, an integrated circuit, a computer program, or a non-transitory computer-readable recording medium such as a compact disc read-only memory (CD-ROM), or any combination of systems, methods, integrated circuits, computer programs, or recording media.

With the management system, etc., according to the present disclosure, it is possible to prevent improper use of a locker device including one or more storage units.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4A illustrates an example of an assignment processing instruction created by a user terminal device according to an embodiment;

FIG. 4B illustrates an example of an assignment processing instruction created by a user terminal device according to an embodiment;

FIG. 5A illustrates an example of a right exercise instruction created by a user terminal device according to an embodiment;

FIG. 5B illustrates an example of a right exercise instruction created by a user terminal device according to an embodiment;

FIG. 6A illustrates an example of a return processing instruction created by a user terminal device according to an embodiment;

FIG. 6B illustrates an example of a return processing instruction created by a user terminal device according to an embodiment;

FIG. 6C illustrates an example of a return processing instruction created by a user terminal device according to an embodiment;

FIG. 6D illustrates an example of a return processing instruction created by a user terminal device according to an embodiment;

FIG. 10 is a diagram illustrating an example of right holder information stored in a right holder information storage unit according to an embodiment;

FIG. 11 is a diagram illustrating an example of right holder information stored in a right holder information storage unit according to an embodiment;

FIG. 12 is a diagram illustrating an example of right holder information stored in a right holder information storage unit according to an embodiment;

FIG. 23 is a sequence chart illustrating an example of an operation in an assignment condition check phase according to Variation 6.

DETAILED DESCRIPTION OF THE EMBODIMENT

Figure 1:
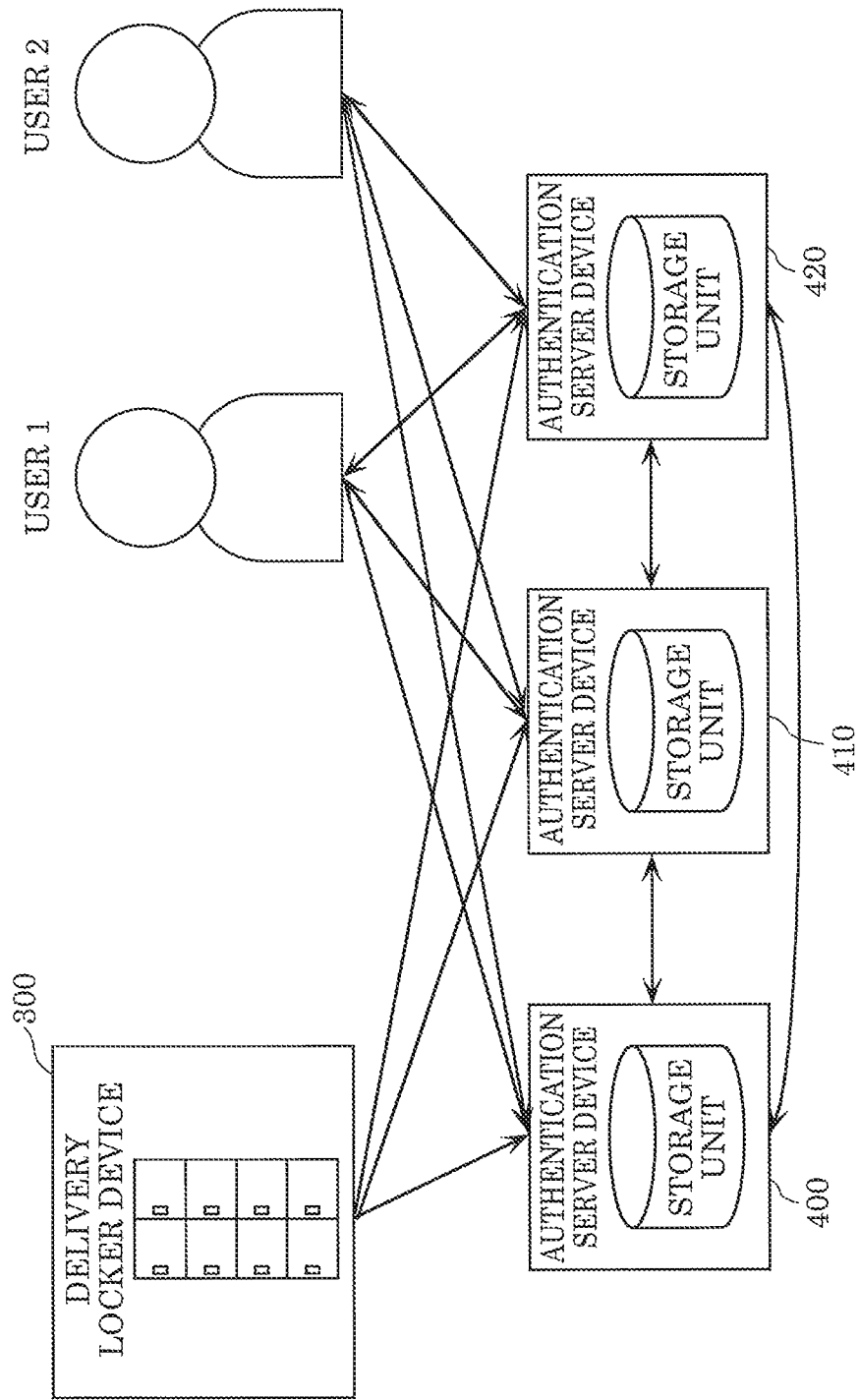
FIG. 1 illustrates an overview of a management system according to an embodiment.

Underlying Knowledge Forming the Basis of the Present Disclosure

For delivery locker systems using blockchains, managing, for example, the right to use a delivery locker by writing, on a blockchain, right holder information, indicating a right holder entitled to use the delivery locker has been considered. In this kind of delivery locker systems, the right is managed or exercised using a mechanism called a smart contract in which an arbitrary program can be executed.

In this kind of delivery locker system, when a user receives a package, the user is supposed to request execution of the smart contract for completion of receipt and return the right of use of the delivery locker to the original right holder.

However, if a malicious user did not request the execution of this smart contract, this user would be able to continue to use the delivery locker wrongfully. Furthermore, even in the case where an innocent user leaves a package or is in a situation that makes it impossible to collect a package, the delivery locker would be unusable for a long period of time.

Here, in response to the problem of being unable to use a delivery locker for a long period of time due to a failure to return the right for a long period of time, for example, an expiration limit can be set upon assignment of the right so that the right can be returned when the expiration limit has passed. In the case of managing the right using the smart contract, however, the smart contract is not automatically executed, and thus the right is not automatically returned even when the expiration limit has passed.

Therefore, in the case of using a blockchain for a delivery locker system, it is considered necessary to detect improper use by a user and automatically return the right of use held by the user to the original right holder.

Thus, a management system according to an aspect of the present disclosure includes: a right holder information storage unit configured to store right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing; an agreement formation unit configured, to create a block of a blockchain and store the block into a block storage unit, the block including a processing instruction; a terminal device which transmits, as one kind of the processing instruction, an assignment processing instruction including a condition for assignment of the right and user information indicating a second user to whom the right is assigned; a process execution unit configured to, when obtaining the assignment processing instruction as one kind of the processing instruction included in the block, update a current right holder included in the right holder information from the first user to the second user; and a condition checking unit configured to check whether the condition for assignment is met, and when determining that the condition for assignment fails to be met, create a return processing instruction for returning the right from the second user to the first user, and transmit the return processing instruction to the agreement formation unit. The process execution unit is configured to, when obtaining the return processing instruction as one kind of the processing instruction included in the block, update the second user included in the right holder information to the first user.

With this configuration, a condition for assignment such as an expiration limit is managed along with an assignee when a right such as the right of use is assigned, and thus the right can be automatically returned to the original right holder when the condition for assignment is no longer met such as when the expiration limit has passed. This makes it possible to prevent improper use of a locker device including one or more storage units.

For example, the condition for assignment is one of an expiration limit, a total number of uses, and a total number of permitted reassignment.

Furthermore, for example, the condition for assignment may be set by being input to the terminal device.

For example, the management system further includes: the terminal device; the locker device; and a server device. The server device includes the right holder information storage unit, the agreement formation unit, the process execution unit, and the condition checking unit. The condition checking unit is configured to check, at a predetermined interval, whether the condition for assignment is met.

Furthermore, for example, the management system may further include: the terminal device; the locker device; a server device; and a locker control device which controls the locker device. The server device includes the agreement formation unit. The locker control device may include the right holder information storage unit, the process execution unit, and the condition checking unit. The condition checking unit may be configured to check, at a predetermined interval, whether the condition for assignment is met.

Furthermore, for example, the terminal device may further transmit a request for update of the right holder information. The condition checking unit may be further configured to, when receiving the request for update, check whether the condition for assignment is met.

Furthermore, a server according to an aspect of the present disclosure includes; a right holder information storage unit configured to store right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing; an agreement formation unit configured, to create a block of a blockchain and store the block into a block storage unit, the block including a processing instruction; a process execution unit configured to, when obtaining an, assignment processing instruction as one kind of the processing instruction included in the block, update a current right holder included in the right holder information from the first user to a second user to whom the right is assigned, the assignment processing instruction including a condition for assignment of the right and user information indicating the second user; and a condition checking unit configured to check whether the condition for assignment is met, and when determining that the condition for assignment fails to be met, create a return processing instruction for returning the right from the second user to the first user, and transmit the return processing instruction to the agreement formation unit. The process execution unit is configured to, when obtaining the return processing instruction as one kind of the processing instruction included in the block, update the second user included in the right holder information to the first user.

Furthermore, a management method according to an aspect of the present disclosure includes: storing right holder information about a right to one locker in a locker device, the right holder information including a first user who is a right holder entitled to use the one locker, the ocher device including one or more lockers each of which accommodates a tangible object in a physical space and includes a lock that is locked and unlocked by electronic processing; forming an agreement by creating a block of a blockchain and storing the block into a block storage unit, the block including a processing instruction; executing a process by, when obtaining an assignment processing instruction, as one kind of the processing instruction included in the block, updating a current right holder included in the right holder information from the first user to a second user to whom the right is assigned, the assignment processing instruction including a condition for assignment of the right and user information indicating the second user; and checking a condition by checking whether the condition for assignment is met, and when determining that the condition for assignment fails to be met, creating a return processing instruction for returning the right from the second user to the first user, and transmitting the return processing instruction to a computer which forms the agreement. In the executing, when obtaining the return processing instruction as one kind of the processing instruction included in the block, the second user included in the right holder information is updated to the first user.

Note that the embodiment described below presents a specific example of the present disclosure. The numerical values, shapes, structural elements, steps, the processing order of the steps, etc. presented in the following embodiment are mere examples, and therefore do not limit the present disclosure. As such, among the structural elements in the following embodiment, structural elements not recited in any one of the independent claims which indicate the broadest concepts are described as arbitrary structural elements. Furthermore, details of different embodiments may be combined.

EMBODIMENT

Hereinafter, a management system in an embodiment will be described with reference to the drawings.

1. Embodiment

As an embodiment of the present disclosure, a management system for a delivery locker according to the present disclosure will be described with reference to the drawings.

1.1 Overall Configuration of Management System

Figure 2:
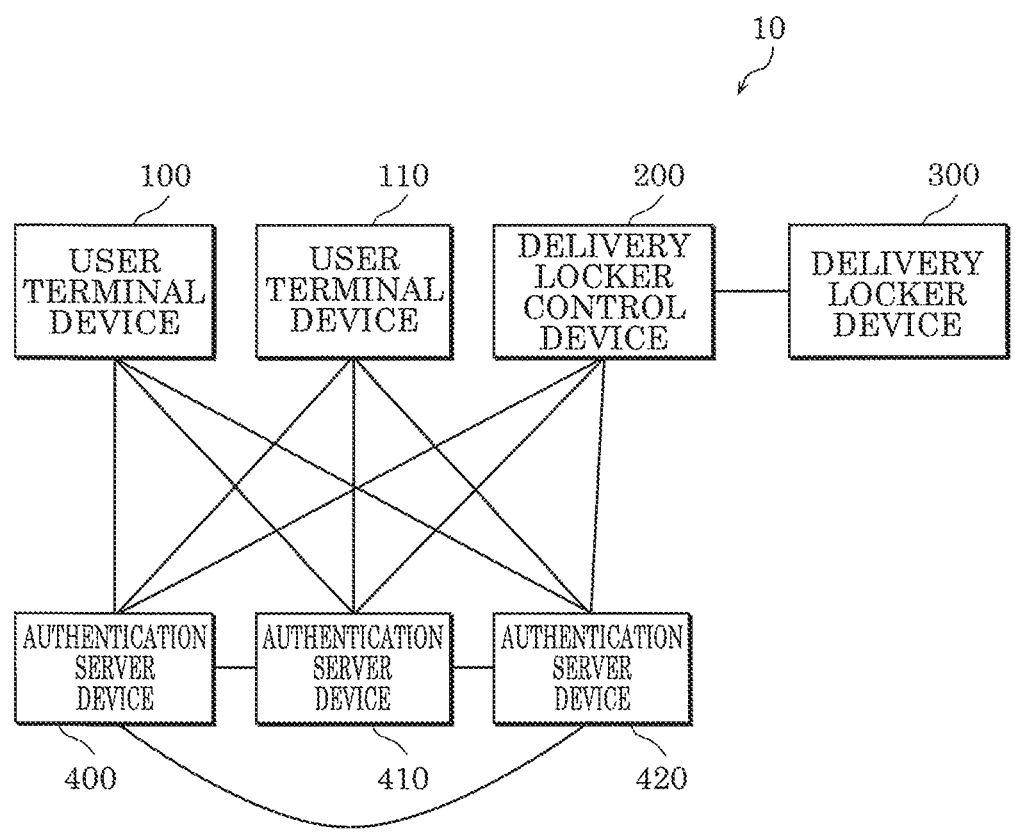
FIG. 2 illustrates an example of the overall configuration of a management system according to an embodiment.

FIG. 1 illustrates an overview of management system 10 according to the embodiment. FIG. 2 illustrates an example of the overall configuration of management system 10 according to the embodiment. Management system 10 according to the embodiment manages, using a blockchain, a right such as the right of use of at least one locker in a locker device including one or more storage units, thereby preventing improper use of the one or more lockers. In the example illustrated in FIG. 1, management system 10 manages, using a blockchain, a right such as the right of use of at least one delivery locker in, a delivery locker device including one or more delivery lockers as one or more storage units. More specifically, management system 10 accumulates records of transaction such as transfer of the right from user 1 to user 2 in a shared ledger formed on the blockchain infrastructure and stored in storage units of respective authentication server devices 400, 410, and 420 to manage the right.

In the present embodiment, as illustrated in FIG. 2, management system 10 includes user terminal devices 100 and 110, delivery locker control device 200, delivery locker device 300, and three authentication server devices 400, 410, and 420. The connection configuration between the devices may be any of wired Internet connection, wireless communication, dedicated communication, and the like. Note that although FIG. 2 illustrates an example in which management system 10 includes two user terminal devices 100 and 110, this is not limiting; two or more user terminal devices may be provided. Likewise, although management system 10 includes one delivery locker control device 200 in the illustrated example, it is sufficient that at least one delivery locker control device be provided. Furthermore, although management system 10 includes three authentication server devices 400, 410, and 420 in the illustrated example, this is not limiting; it is sufficient that at least two authentication server devices be provided. Delivery locker control device 200 and delivery locker device 300 may be disposed in physically different positions, or delivery locker control device 200 may be formed in delivery locker device 300.

1.2 User Terminal Device

Figure 3:
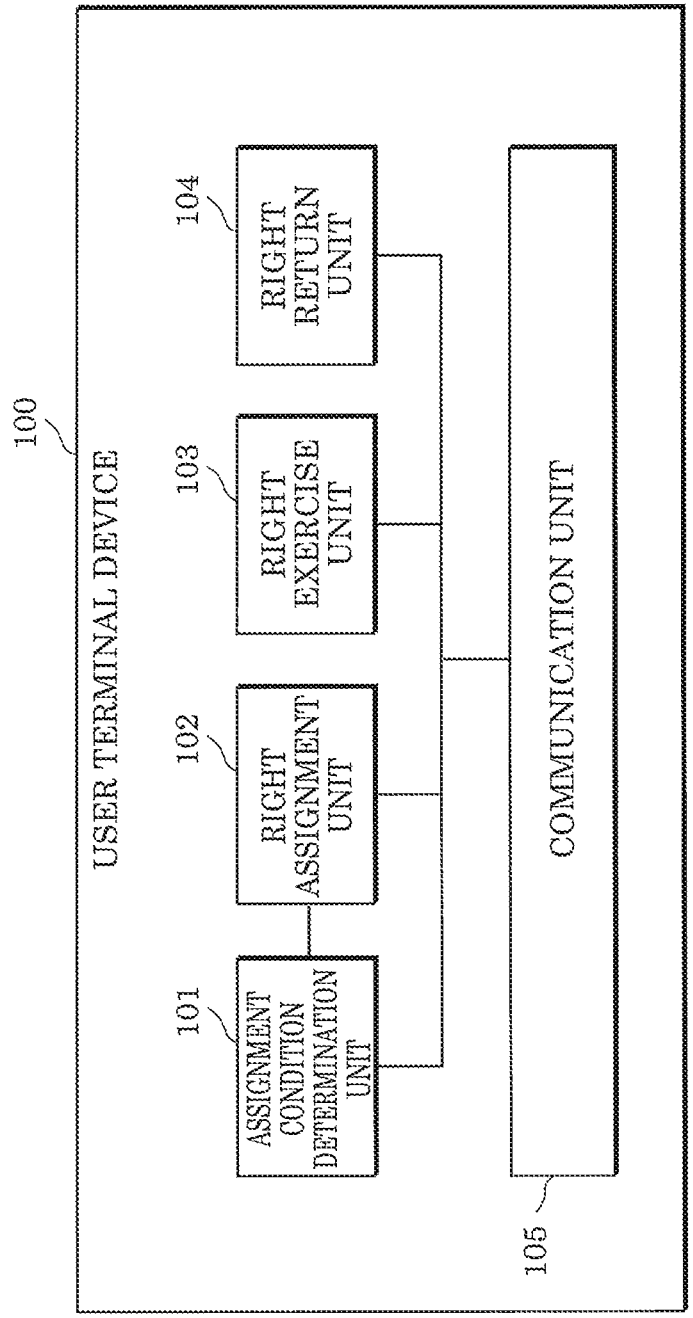
FIG. 3 is a configuration diagram illustrating an example of the detailed configuration of a user terminal device according to an embodiment.

FIG. 3 is a configuration diagram illustrating an example of the detailed configuration of user terminal device 100 according to an embodiment. User terminal device 110 has the same configuration as user terminal device 100 and thus, description thereof will be omitted.

User terminal device 100 is an example of a terminal device and transmits, as one kind of the processing instruction, an assignment processing instruction including a condition for assignment of the right and user information indicating a second user to whom the right to one locker in the locker device including one or more lockers is assigned. Here, the condition for assignment is one of an expiration limit, a total number of uses, and a total number of permitted reassignment. The condition for assignment is set by being input to the terminal device. In the present embodiment, as illustrated in FIG. 3, user terminal device 100 includes assignment condition determination unit 101, right assignment unit 102, right exercise unit 103, right return unit 104, and communication unit 105. User terminal device 100 is implemented, for example, using a computer including a processor (microprocessor), a memory, a sensor, a communication interface, and the like. User terminal device 100 is, for example, a mobile terminal such as a smartphone and a tablet computer. In the following description, the right to use one delivery locker included in delivery locker device 300 is cited as an example of the right to one locker in the locker device.

1.2.1 Assignment Condition Determination Unit

Assignment condition determination unit 101 determines a condition for assignment that is to be set when the right to use a delivery locker is assigned to another user. For example, in the case of using the expiration limit as the condition for assignment, it is sufficient that a user check the expiration limit of the right owned by him- or herself with authentication server device 400 or the like and set an expiration limit on or before the obtained expiration limit. Note that the condition for assignment may be a total number of permitted reassignment, a total number of uses, or the like, other than the expiration limit. In either case, it is sufficient that a user check the condition of use set for the right owned by him- or herself with authentication server device 400 or the like and set a condition for assignment that complies with the condition of use.

Furthermore, assignment condition determination unit 101 may include an interface device which receives input from a user so that a user him or herself can enter a condition for assignment upon assignment to another user. The condition of use may be determined in advance for each delivery locker, and assignment condition determination unit 101 may set a condition for assignment according to the determined condition of use.

1.2.2 Right Assignment Unit

Right assignment unit 102 creates an assignment processing instruction indicating a processing instruction for assigning a right to another user. More specifically, right assignment unit 102 obtains assignee user information indicating a user who is a subject to which the right is assigned, in other words, an assignee, and creates an assignment processing instruction including the obtained assignee user information, the condition for assignment determined by assignment condition determination unit 101, and the signature of the user. Right assignment unit 102 transmits the created assignment processing instruction to authentication server devices 400, 410, and 420 via communication unit 105.

Note that an example of a method for obtaining assignee user information is to obtain the assignee user information by selecting a user who is an assignee from a user list stored in user terminal device 100. Furthermore, for example, user terminal device 100 may include an interface device which reads a barcode, a quick response (QR) code (registered trademark), or the like, and obtain the assignee user information by reading the barcode or the QR code (registered trademark) in which user information is embedded. Right assignment unit 102 may include a device which receives input from a user, and a user him- or herself may enter the assignee user information.

FIG. 4A and FIG. 4B each illustrate an example of the assignment processing instruction created by user terminal device 100 according to the embodiment. FIG. 4A and FIG. 4B each illustrate an example of the assignment processing instruction created by right assignment unit 102 when at least one right owned by a user using user terminal device 100 (for example, Mr./Ms. A) is assigned to another single user (for example, Mr./Ms. B). Specifically, right assignment unit 102 may transmit, to authentication server devices 400, 410, and 420, the same number of assignment processing instructions illustrated in FIG. 4A as the number of delivery lockers subject to the assignment of the right, for example. FIG. 4A illustrates an example of the assignment processing instruction in which the instruction type is assignment, the number of a delivery locker subject to the assignment of the right (LOCKER NUMBER in the drawing) is 001, a user who is an assignee is Mr./Ms. B, an expiration limit which is the condition for assignment is 2018 Jan. 25, and a signature has been provided. As illustrated in FIG. 4B, right assignment unit 102 may transmit, to authentication server devices 400, 410, and 420, an assignment processing instruction encompassing more than one target subject to the assignment of the right. FIG. 4B illustrates an example of the assignment processing instruction in which the instruction type is assignment, the locker numbers of targets subject to the assignment of the right are 001, 003, and 011, a user who is an assignee is Mr./Ms. B, an expiration limit which is the condition for assignment is 2018 Jan. 25, and a signature has been provided.

1.2.3 Right Exercise Unit

Right exercise unit 103 creates a right exercise instruction indicating a processing instruction for the exercise of the right such as unlocking or locking a delivery locker. This processing instruction is also provided with the signature of the user. Right exercise unit 103 transmits the created right exercise instruction to authentication server devices 400, 410, and 420 via communication unit 105.

FIG. 5A and FIG. 5B each illustrate an example of the right exercise instruction created by user terminal device 100 according to the embodiment. FIG. 5A and FIG. 5B each illustrate an example of the right exercise instruction created by right exercise unit 103 when exercising the right owned by a user using user terminal device 100 on the basis of the right. FIG. 5A illustrates an example of the right exercise instruction in which the instruction type is unlock, the number of a locker subject to the exercise of the right is 001, and a signature has been provided. FIG. 5B illustrates an example of the right exercise instruction in which the instruction type is lock, the number of a locker subject to the exercise of the right is 001, and a signature has been provided.

1.2.4 Right Return Unit

Right return unit 104 creates a return processing instruction indicating a processing instruction for returning the right owned by a user to the original, right holder. The return processing instruction is created after the user receives a package or the like stored in a delivery locker. More specifically, right return unit 104 checks right holder information including the original right holder with any of authentication server devices 400, 410, and 420, and creates a return processing instruction, including the signature of the user and the original right holder included in the obtained right holder information. Right return unit 104 transmits the created return processing instruction to authentication server devices 400, 410, and 420 via communication unit 105.

FIG. 6A, FIG. 6B, FIG. 6C, and FIG. 6D each illustrate an example of the return processing instruction created by user terminal device 100 according to the embodiment. FIG. 6A to FIG. 6D each illustrate an example of the return processing instruction created, by right return unit 104 when at least one right owned by a user (for example, Mr./Ms. B) using user terminal device 100 is returned to the original single user.

Specifically, right return, unit 104 may transmit, to authentication server devices 400, 410, and 420, the same number of return processing instructions illustrated in FIG. 6A and FIG. 6B as the number of delivery lockers subject to the return of the right, for example. FIG. 6A illustrates an example of the return processing instruction in which the instruction type is return, the number of a delivery locker subject to the return of the right (LOCKER NUMBER in the drawing) is 001, a user who is an assignor is Mr./Ms. A, and a signature has been provided. FIG. 6B illustrates an example of the return processing instruction in which the instruction type is return, the locker numbers of a target subject to the return of the right is 002, a user who is an assignor is an administrator, and a signature has been provided.

As illustrated in FIG. 6C, right return unit 104 may transmit, to authentication server devices 400, 410, and 420, a return processing instruction encompassing more than one target subject to the return of the right. FIG. 6C illustrates an example of the return processing instruction in which the instruction type is return, the locker numbers of targets subject to the return of the right are 001, 003, and 011, a user who is an assignor is Mr./Ms. A, and a signature has been provided.

Suppose, for example, that an administrator assigns a right to Mr./Ms. A, who is one user, and furthermore Mr./Ms. A assigns the right to Mr./Ms. B, who is one user. In this case, the return processing instruction illustrated in FIG. 6A may be created to return the right to Mr./Ms. A first, and then Mr./Ms. A may create the return processing instruction illustrated in FIG. 6B to return the right to the administrator. Alternatively, the return processing instruction illustrated in FIG. 6D for returning the right directly to the administrator may be created to return the right to the administrator. In other words, right return unit 104 may transmit, to authentication server devices 400, 410, and 420, a return processing instruction encompassing two or more users as assignors, as illustrated in FIG. 6D. FIG. 6D illustrates an example of the return processing instruction in which the instruction type is return, the locker number of a target subject to the return of the right is 005, users who are assignors are Mr./Ms. A and the administrator, and the signature of Mr./Ms. B has been provided.

1.2.5 Communication Unit

Communication unit 105 is implemented using a processor, a communication interface, and the like and performs communication with authentication server devices 400, 410, and 420. More specifically, communication unit 105 transmits the processing instruction created by right assignment unit 102, right exercise unit 103, and right return unit 104 to authentication server devices 400, 410, and 420, and requests check of the right or execution of a process.

Furthermore, communication unit 105 may receive the result of checking the right, the result of the process, or the like, and transmit the result to right assignment unit 102, right exercise unit 103, or right return unit 104.

1.3 Delivery Locker Control Device

Figure 7:
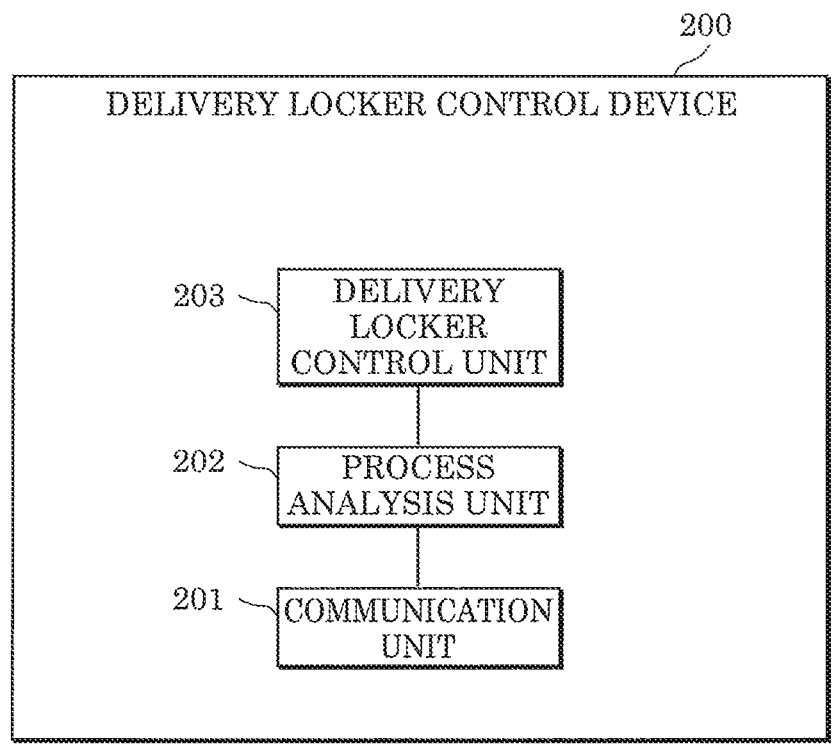
FIG. 7 is a configuration diagram illustrating an example of the detailed configuration of a delivery locker control device according to an embodiment.

FIG. 7 is a configuration diagram illustrating an example of the detailed configuration of delivery locker control device 200 according to an embodiment. Delivery locker control device 200 is an example of a locker control device and controls a locker device. In the present embodiment, delivery locker control device 200 obtains the processing instruction transmitted from user terminal devices 100 and 110 to authentication server devices 400, 410, and 420 and transmits an instruction for executing a process to delivery locker device 300. As illustrated in FIG. 7, delivery locker control device 200 includes communication unit 201, process analysis unit 202, and delivery locker control unit 203. Delivery locker control device 200 is implemented, for example, using a computer including a processor (microprocessor), a memory, a sensor, a communication interface, and the like.

1.3.1 Communication Unit

Communication unit 201 is implemented using a processor, a communication interface, and the like and receives the processing instruction transmitted from user terminal devices 100 and 110 to authentication server devices 400, 410, and 420. Communication unit 201 transmits the received processing instruction to process analysis unit 202.

After authentication server devices 400, 410, and 420 create a new block, communication unit 201 may receive a processing instruction transmitted to delivery locker control device 200 and included in the block. Furthermore, communication unit 201 may request authentication server device 400, etc., at a predetermined interval to, if there is a new processing instruction, transmit the processing instruction, and accordingly may receive the processing instruction transmitted from authentication server device 400, etc.

Note that communication unit 201 may receive, from authentication server device 400, etc., all the processing instructions that have been transmitted from user terminal devices 100 and 110. Alternatively, communication unit 201 may receive only the processing instruction transmitted from user terminal devices 100 and 110 on and after the point in time of the last request which requests authentication server device 400, etc., to, if there is a new processing instruction, transmit the processing instruction.

Communication unit 201 may receive one processing instruction from authentication server device 400, etc., at a time or may receive two or more processing instructions from authentication server device 400, etc., at a time. Communication unit 201 that has received two or more processing instructions at a time may transmit one processing instruction to process analysis unit 202 at a time or may transmit two or more processing instructions to process analysis unit 202 at a time.

1.3.2 Process Analysis Unit

Process analysis unit 202 analyzes the processing instruction transmitted from communication unit 201. More specifically, process analysis unit 202 analyzes the type of the received processing instruction and the type of the process for the exercise of the right.

Furthermore, process analysis unit 202 transmits, to delivery locker control unit 203, the analyzed instruction to perform the process for the exercise of the right. Process analysis unit 202 transmits, to delivery locker control unit 203, an instruction for performing a process such as locking or unlocking the delivery locker subject to the exercise of the right, for example, as the instruction resulting from the analysis.

1.3.3 Delivery Locker Control Unit

Delivery locker control unit 203 transmits, to delivery locker device 300, the instruction for the delivery locker subject to the exercise of the right that has been transmitted from process analysis unit 202.

1.4 Delivery Locker Device

Figure 8:
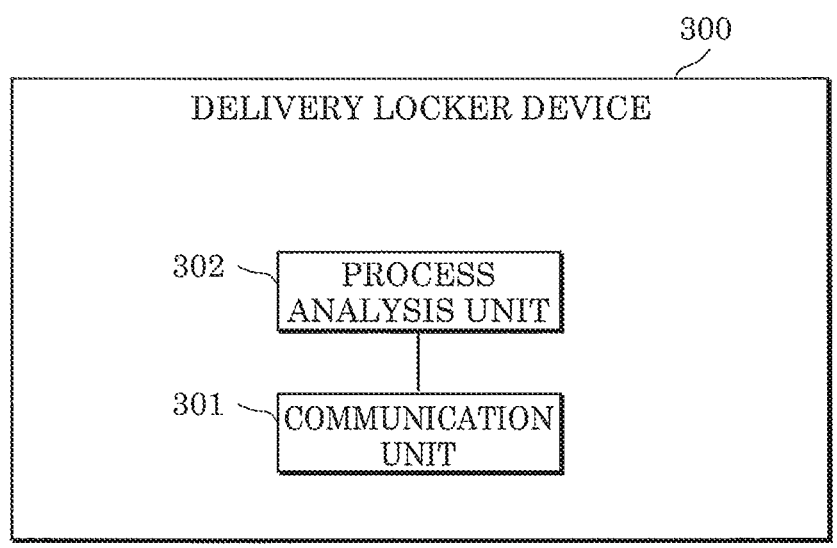
FIG. 8 is a configuration diagram illustrating are example of the detailed configuration of a delivery locker device according to an embodiment.

FIG. 8 is a configuration diagram illustrating an example of the detailed configuration of delivery locker device 300 according to the embodiment. Delivery locker device 300 is an example of a locker device including one or more lockers each of which accommodates a tangible object in a physical space and includes a lock that is locked and unlocked by an electronic process. In other words, the one or more lockers are not limited to one or more delivery lockers as long as the lockers are one or more storage units each of which accommodates a tangible object in a physical space and includes a lock that is locked and unlocked by an electronic process. The locker device is not limited to a delivery locker device as long as the locker device includes one or more storage units.

In the present embodiment, delivery locker device 300 includes communication unit 301 and process execution unit 302. Delivery locker device 300 includes one or more delivery lockers and receives the instruction transmitted from delivery locker control device 200 to execute a locking or unlocking process or the like. Delivery locker device 300 locks or unlocks the target delivery locker according to the received instruction.

1.4.1 Communication Unit

Communication unit 301 is implemented using a processor, a communication interface, and the like, receives the instruction transmitted from delivery locker control device 200 to, for example, unlock or lock the target delivery locker, and transmits the instruction to process execution unit 302. Note that communication herein may be communication between networks such as the hypertext transfer protocol (HTTP) or may be serial communication using a serial port or a universal serial bus (USB)

1.4.2 Process Execution Unit

Process execution unit 302 unlocks or locks the target delivery locker, for example, according to the instruction received from communication unit 301.

1.5 Authentication Server Device

Figure 9:
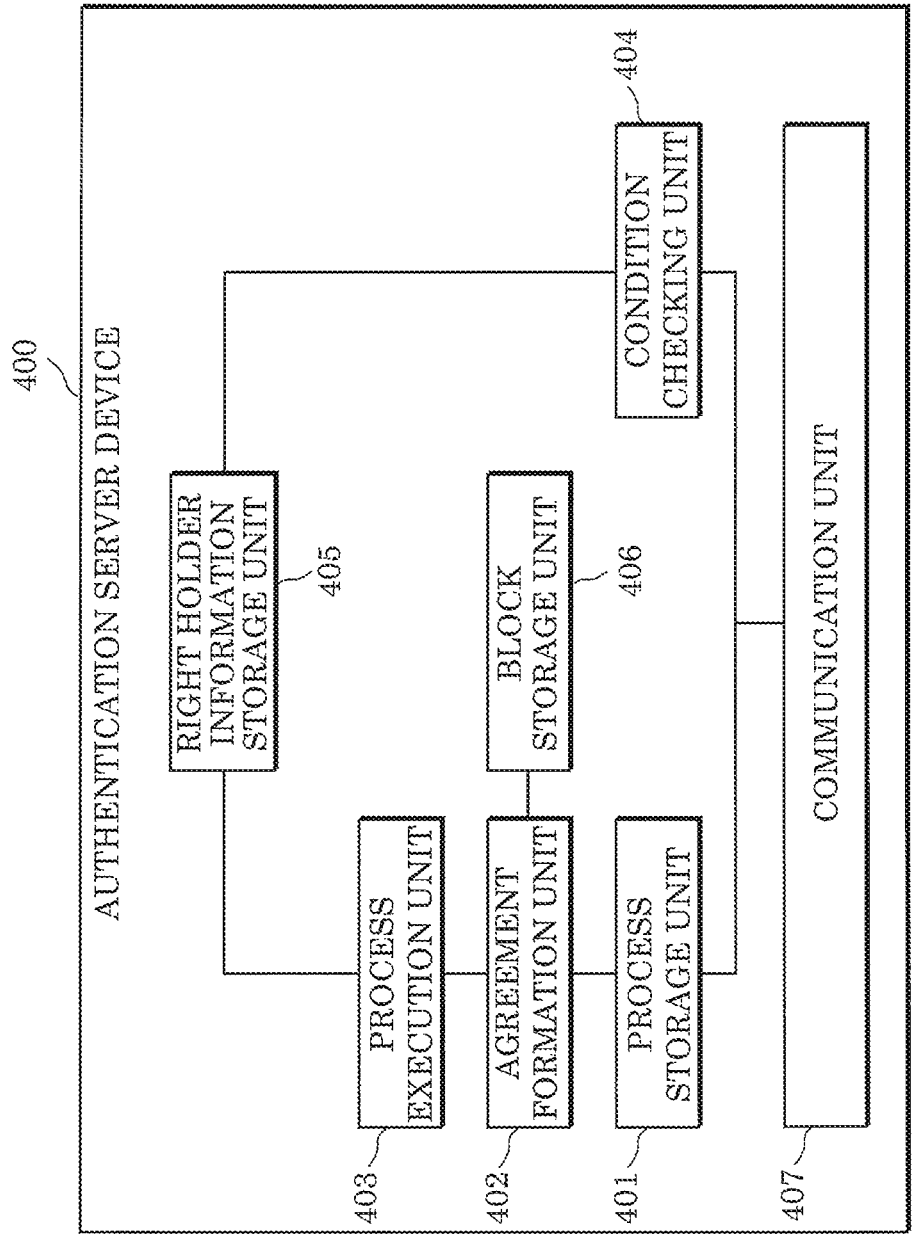
FIG. 9 is a configuration diagram illustrating an example of the detailed configuration of an authentication server device, according to an embodiment.

FIG. 9 is a configuration diagram illustrating an example of the detailed configuration of authentication server device 400 according to the embodiment. Authentication server device 400, 410, and 420 include a shared ledger formed on the blockchain infrastructure and manage a right by accumulating records of transaction of a right of use such as assignment of the right. Note that authentication server devices 410 and 420 have the same configuration as the configuration of authentication server device 400; therefore, authentication server device 400 will be described in detail, and description of authentication server devices 410 and 420 will be omitted.

In the present embodiment, authentication server device 400 includes process storage unit 401, agreement formation unit 402, process execution unit 403, condition checking unit 404, right holder information storage unit 405, block storage unit 406, and communication unit 407. Authentication server device 400 is implemented, for example, using a computer including a processor (microprocessor), a memory, a sensor, a communication interface, and the like. Authentication server device 400 receives a processing instruction from user terminal devices 100 and 110, verifies a signature, and executes a process when necessary.

1.5.1 Process Storage Unit

Process storage unit 401 stores, in other words, saves, processing instructions received from user terminal devices 100 and 110. In the present embodiment, process storage unit 401 stores right exercise instructions, return processing instructions, or assignment processing instructions received from user terminal devices 100 and 110. Furthermore, process storage unit 401 stores a return processing instruction shared with other authentication server devices 410 and 420.

1.5.2 Agreement Formation Unit

Agreement formation unit 402 creates a block of a blockchain that includes the processing instruction, and stores the block into block storage unit 406.

More specifically, agreement formation unit 402 performs communication with the agreement formation units in other authentication server devices 410 and 420 via communication unit 407 and verifies the signature of a user included in the processing instruction stored in process storage unit 401. When the signature of the user included in the processing instruction is confirmed as valid through verification, agreement formation unit 402 creates a block by a predetermined method in the blockchain and transmits the block to block storage unit 406. Furthermore, agreement formation unit 402 transmits the processing instruction included in the created block to process execution unit 403.

Here, an example of the method for creating a block of a blockchain will be described. For example, the hash value of the latest block that has been created is calculated, and data is created by combining the calculated hash value and the processing instruction. Next, data called a nonce is added to the end of the combined data, and a hash value is calculated, in the present embodiment, agreement formation unit 402 changes the value of this nonce, for example, to find a nonce that makes the hash value less than or equal to a predetermined value. Next, agreement formation unit 402 transmits, as a block, data obtained by combining the hash value, the processing instruction, and the nonce in the latest block to (the agreement formation units in) other authentication server devices 410 and 420. Subsequently, the agreement, formation units in authentication server devices 410 and 420 that have received the data check whether the hash value of the block is less than or equal to the predetermined value, and confirm the data as a block.

Furthermore, if necessary, agreement formation unit 402 may transmit the processing instruction included in the created block to delivery locker control device 200 that is subject to the process.

1.5.3 Process Execution Unit

When obtaining an assignment processing instruction as one kind of the processing instruction included in the created block in the blockchain, process execution unit 403 executes the process of updating the current right holder included in the right holder information from the first user to the second user. Furthermore, when obtaining a return processing instruction as one kind of the processing instruction included in the created block in the blockchain, process execution unit 403 updates the second user included in the right holder information to the first user.

In the present embodiment, process execution unit 403 executes the processing instruction transmitted from user terminal device 100, etc. For example, when the transmitted processing instruction is an assignment processing instruction, process execution unit 403 transmits the set condition for assignment and the user information indicating an assignee to right holder information storage unit 405, and updates the right holder information to include the new data in the right holder information. Furthermore, for example, when the transmitted processing instruction is a return processing instruction, process execution unit 403 updates the right holder information stored in right holder information storage unit 405 to change the current right holder included in the right holder information to the right holder to whom the right is returned, i.e., the original right holder.

1.5.4 Condition Checking Unit

Condition checking unit 404 checks whether the condition for assignment is met, and when determining that, the condition for assignment fails to be met, creates a return processing instruction to return the right from the second user to the first user, and transmits the return processing instruction to agreement formation unit 402. Here, condition checking unit 404 checks at the predetermined interval whether the condition for assignment is met.

In the present embodiment, condition checking unit 404 obtains, at the predetermined interval, the right holder information stored in right holder information storage unit 405, to determine whether the condition for assignment is met. For example, in the case where the condition for assignment is an expiration limit, condition checking unit 404 obtains, at the predetermined interval, the right holder information stored in right holder information storage unit 405, and compares the expiration data with the current time to determine whether the expiration limit has not passed. When the expiration limit of one delivery locker has passed, condition checking unit 404 creates a return processing instruction, and transmits the return processing instruction to process storage unit 401 and agreement formation unit 402 in order to allow all authentication server devices 400, 410, and 420 to share the return processing instruction.

As the sharing method, predetermined authentication server device 400, etc., may create a return processing instruction and transmit the return processing instruction to different authentication server device 410, etc. Another sharing method is to create a return processing instruction in accordance with a predetermined rule to allow all authentication server devices 400, 410, and 420 to share the same return processing instruction.

1.5.5 Right Holder Information Storage Unit

Right holder information storage unit 405 stores right holder information about the right to one locker in the locker device which includes the first user who is a right holder entitled to use the locker.

In the present embodiment, right holder information storage unit 405 stores right holder information about the right to a delivery locker. For example, when process execution unit 403 executes the right assignment process transmitted from the user, the right holder information in right holder information storage unit 405 is updated to include the condition for assignment and user information indicating a right holder. Furthermore, for example, when process execution unit 403 executes the right return process transmitted from the user or when condition checking unit 404 determines that the condition for assignment fails to be met, the right holder information in right holder information storage unit 405 is updated so that the user who is the original right holder becomes the right holder.

FIG. 10, FIG. 11, and FIG. 12 each illustrate an example of the right holder information stored, in right holder information storage unit 405 according to the embodiment. FIG. 10 illustrates an example of the right holder information stored in right holder information storage unit 405 at a certain point in time. The arrows indicated in FIG. 10 represent that the right has been assigned; the right holder indicated at the base of each arrow is an assignor (i.e., the original right holder) and the right holder indicated at the tip of each arrow is an assignee a right holder to whom the right is assigned).

FIG. 11 illustrates an example of the right holder information obtained after a user called. Mr./Ms. F, who is the right holder of a locker having locker number 003 illustrated in FIG. 10, assigns the right to another user called Mr./Ms. G. The example illustrated in FIG. 11 shows that the right is assigned by updating the right holder information to include, in the right holder information, the user called Mr./Ms. G, who is a right holder as an assignee, and an expiration limit which is the condition for assignment.

FIG. 12 illustrates an example of the right holder information obtained after a user called Mr./Ms. C, who is the right holder of a locker having locker number 001 illustrated in FIG. 10, returns the right to the original right holder called Mr./Ms. B. The example illustrated in FIG. 12 shows that the right is returned by updating the right holder information to delete, from the right holder information, the user called Mr./Ms. C, who is a right holder as an assignee, and an expiration limit which is the condition for assignment.

1.5.6 Block Storage Unit

Block storage unit 406 store a block of a blockchain that includes a processing instruction.

More specifically, block storage unit 406 stores blocks created by agreement formation unit 402 as a result of the blocks created by agreement formation unit 402 being accumulated in the shared ledger formed on the blockchain infrastructure.

Note that block storage unit 408 may have a ledger in which the condition of use set for the right has been written in advance. The condition of use may be different for each delivery locker or may be the same.

1.5.7 Communication Unit

Communication unit 407 is implemented using a processor, a communication interface, and the like, and performs communication with user terminal devices 100 and 110 and/or delivery locker control device 200. In the present embodiment, when receiving a processing instruction from user terminal devices 100 and 110, for example, communication unit 407 stores the processing instruction into process storage unit 401. Furthermore, communication unit 407 transmits the processing instruction stored in process storage unit 401 to delivery locker control device 200. It is sufficient that in response to a request from delivery locker control device 200, communication unit 407 transmit all the processing instructions or transmit the processing instructions obtained on and after a certain point in time.

Furthermore, when receiving an inquiry about the condition of use set for the right from user terminal devices 100 and 110, communication unit 407 transmits the condition of use stored hi block storage unit 406 or a storage unit not illustrated in the drawings.

1.6 Operation of Management System

Next, the operation of management system 10 configured as described above will be described. The operation of management system 10 includes four phases, namely, a right exercise phase for exercising the right, a right return phase for returning the right, a right assignment phase for assigning the right, and an assignment condition check phase for checking whether the condition for assignment is met. These phases are described one by one below.

1.6.1 Right Exercise Phase

Figure 13:
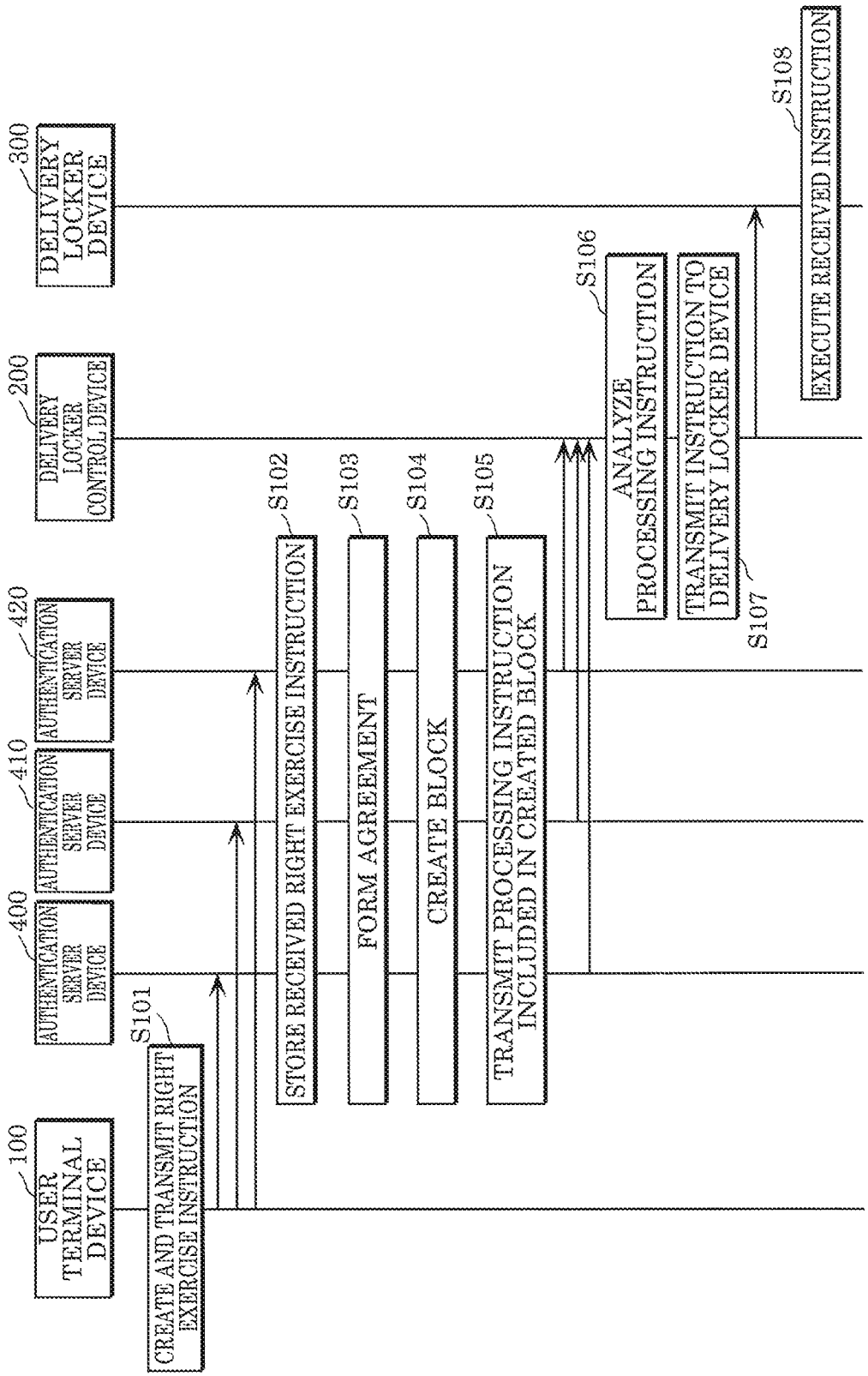
FIG. 13 is a sequence chart illustrating an example of an operation in a right exercise phase according to an embodiment.

FIG. 13 is a sequence chart illustrating an example of the operation in the right exercise phase according to the embodiment.

Hereinafter, the operation in the right exercise phase of management system 10 will be described with reference to FIG. 13.

First, when a desired process related to the exercise of the right such as unlocking or locking a delivery locker the right of which is owned by a user is selected, user terminal device 100 creates a corresponding right exercise instruction and transmits the instruction to authentication server devices 400, 410, and 420 (Step S101).

Next, authentication server devices 400, 410, and 420 store the right exercise instruction received from user terminal device 100 into process storage unit 401 (Step S102).

Next, all authentication server devices 400, 410, and 420 check the signature included in the received right exercise instruction and form an agreement (Step S103). Subsequently, all authentication server devices 400, 410, and 420 create a block of the blockchain that includes the received right exercise instruction (Step S104). The created block is stored into block storage unit 406.

Next, all authentication server devices 400, 410, and 420 transmit the processing instruction included in the created block to delivery locker control device 200 that controls a target delivery locker device (Step S105). Here, as the processing instruction included in the created block, the right exercise instruction is transmitted to delivery locker control device 200.

Next, delivery locker control device 200 receives the processing instruction, and then analyzes the type of the received processing instruction and the type of the process for the exercise of the right (Step S106). Here, analysis by delivery locker control device 200 shows that the processing instruction indicates the process for the exercise of the right such, as unlocking, or locking a delivery locker the right of which is owned by a user.

Next, delivery locker control device 200 transmits an instruction such as a message for controlling the delivery locker device as the instruction for performing the analyzed process for the exercise of the right to delivery locker device 300 (Step S107).

At the end, delivery locker device 300 executes the received instruction, for example, unlocks or locks the delivery locker (Step S108).

1.6.2 Right Return Phase

Figure 14:
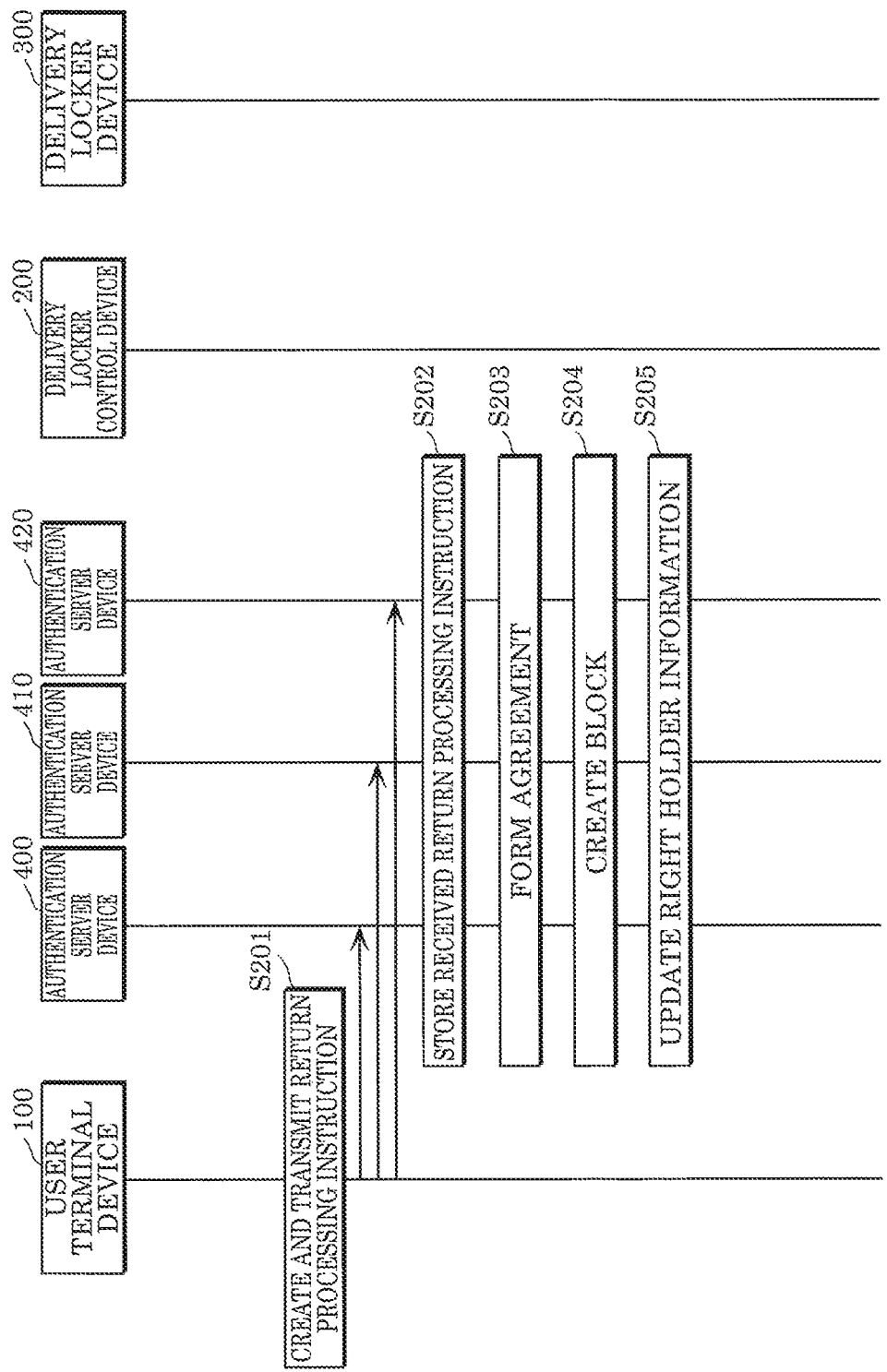
FIG. 14 is a sequence chart illustrating an example of an operation in a right return phase according to an embodiment.

FIG. 14 is a sequence chart illustrating an example of the operation in the right return phase according to the embodiment.

Hereinafter, the operation in the right return phase of management system 10 will be described with reference to FIG. 14.

First, user terminal device 100 creates a return processing instruction for returning the right owned by the user, and transmits the return processing, instruction to authentication server devices 400, 410, and 420 (Step S201).

Next, authentication server devices 400, 410, and 420 store the return processing, instruction received from user terminal device 100 into process storage unit 402 (Step S202).

Next, all authentication server devices 400, 410, and 420 check the signature included in the received return processing instruction and form an agreement (Step S203). Subsequently, all authentication server devices 400, 410, and 420 create a block of the blockchain that includes the received return processing instruction (Step S204). The created block is stored into block storage unit 406.

At the end, each of all authentication server devices 400, 410, and 420 updates the right holder information stored in right holder information storage unit 405 (Step S205) to change the current right holder included in the right holder information from the user to the assignor, i.e., the original right holder.

1.6.3 Right Assignment Phase

Figure 15:
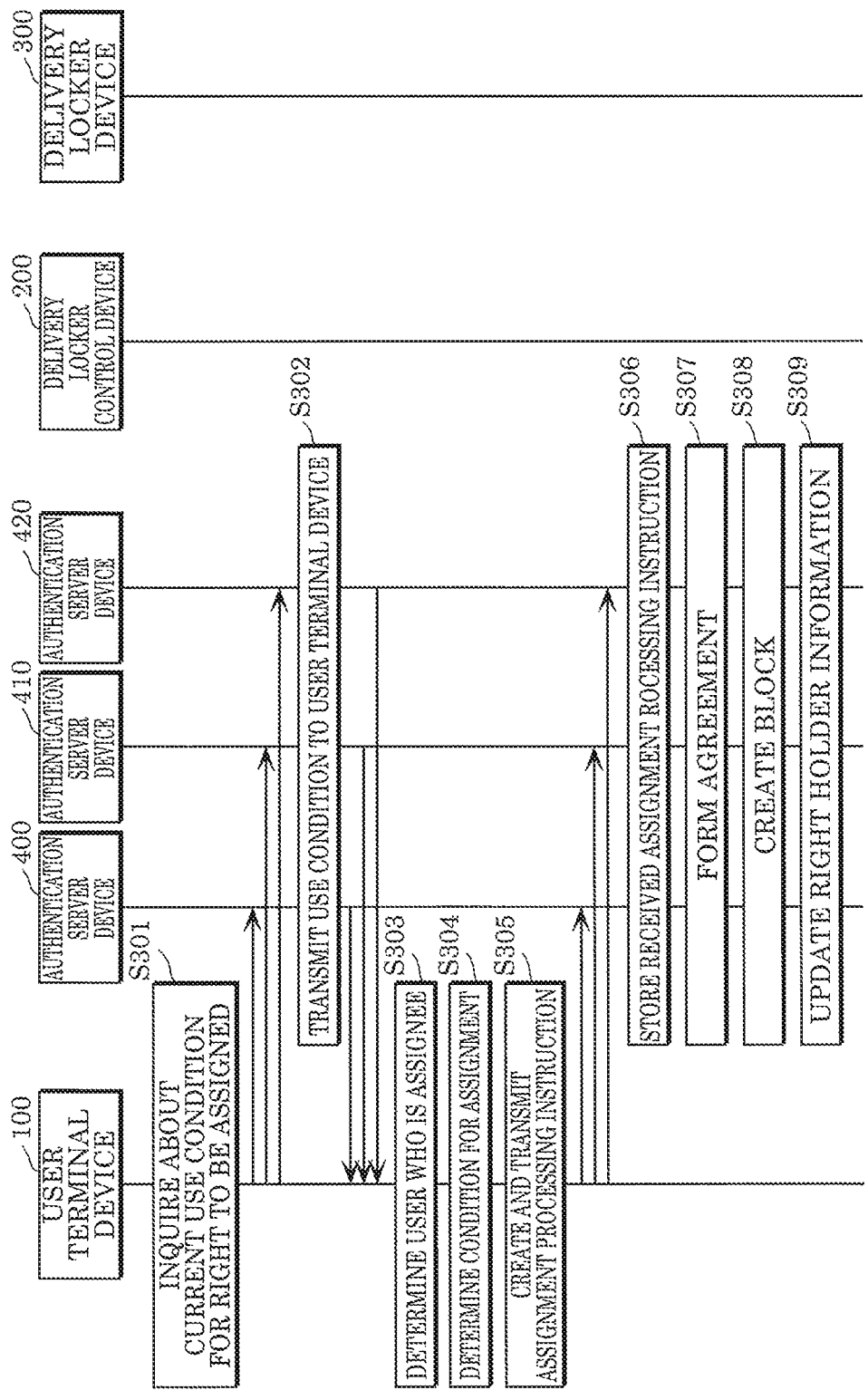
FIG. 15 is a sequence chart illustrating an example of an operation in a right assignment phase according to an embodiment.

FIG. 15 is a sequence chart illustrating an example of the operation in the right assignment phase according to the embodiment.

Hereinafter, the operation in the right assignment phase of management system 10 will be described with reference to FIG. 15.

First, user terminal device 100 sends, to authentication server devices 400, 410, and 420, an inquiry about the condition of use set for the right that is owned by the user and is to be assigned to another user (Step S301).

Next, authentication server devices 400, 410, and 420 receive the inquiry and transmit the condition of use for the right to the target delivery locker to user terminal device 100 (Step S302).

Next, user terminal device 100 selects (in other words, determines) a user to whom the right is assigned (Step S303), and determines a condition for assignment that complies with the condition of use received from authentication server devices 400, 410, and 420 (Step S304).

Next, user terminal device 100 creates a signature and an assignment processing instruction including the number of the delivery locker subject to the assignment of the right, the assignee user information, and the determined condition for assignment, includes the signature in the assignment processing instruction, and transmits the resultant assignment processing instruction to authentication server devices 400, 410, and 420 (Step S305).

Next, authentication server devices 400, 410, and 420 store the assignment processing instruction, received from user terminal device 100 into process storage unit 401 (Step S306).

Next, all authentication server devices 400, 410, and 420 check the signature included in the received assignment processing instruction and form an agreement (Step S307). Subsequently, all authentication server devices 400, 410, and 420 create a block of the blockchain that includes the received assignment processing instruction (Step S308). The created block is stored into block storage unit 406.

At the end, each of all authentication server devices 400, 410, and 420 updates, according to the assignment processing instruction, the right holder information stored in right holder information storage unit 405 (Step S309) to change the current right holder included in the right holder information to the user to whom the right is assigned.

1.6.4 Assignment Condition Check Phase

Figure 16:
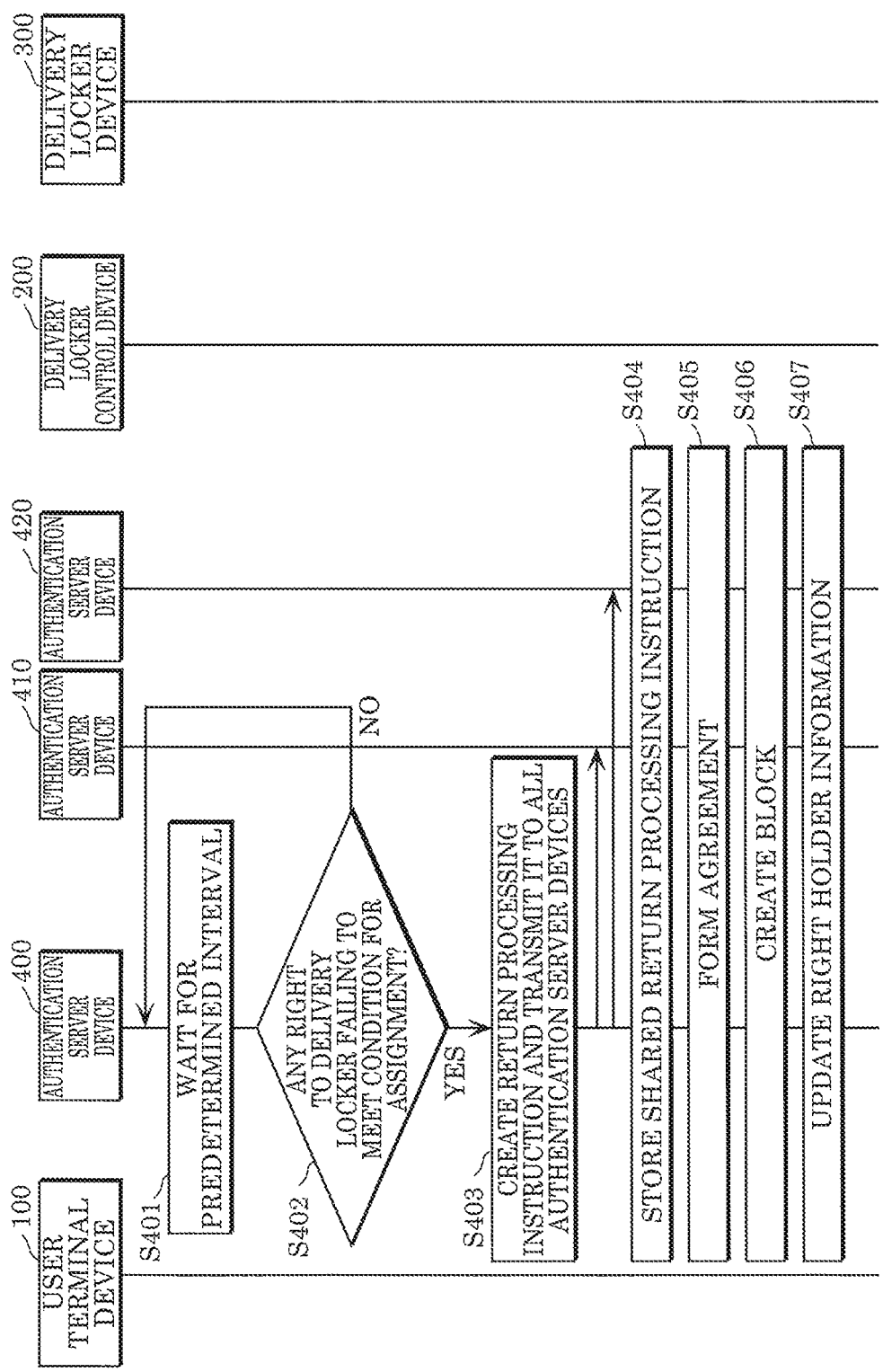
FIG. 16 is a sequence chart illustrating an example of an operation in an assignment condition check phase according to an embodiment.

FIG. 16 is a sequence chart illustrating an example of the operation in the assignment condition check phase according to the embodiment.

Hereinafter, the assignment condition check phase of management system 10 will be described with reference to FIG. 16. In the following description, suppose that predetermined one authentication server device 400 checks the condition for assignment such as the expiration limit.

First, authentication server device 400 waits for the predetermined interval (Step S401) because authentication server device 400 determines at the predetermined intervals whether the condition for assignment is met.

Next, after the lapse of the predetermined interval, authentication server device 400 determines whether there is any right to a delivery locker that fails to meet the condition for assignment among the rights to all the delivery lockers (Step S402). For example, in the case where the condition for assignment is an expiration limit, authentication server device 400 obtains the current time and determines whether there is any overdue right to a delivery locker among the rights to all the delivery lockers.

When none of the rights to the delivery lockers fails to meet the condition for assignment in Step S402 (NO in Step S402), the processing returns to Step S401, which means another wait for the predetermined interval. For example, in the case where the condition for assignment is an expiration limit, no overdue right to any delivery locker results in another wait for the predetermined interval.

On, the other hand, when there is a right to a delivery locker that fails to meet the condition for assignment in Step S402 (YES in Step S402), a return processing instruction is created for the right to the delivery locker, and transmitted to all authentication server devices 410 and 420 (Step S403). For example, in the case where the condition for assignment is an expiration limit, when there is an overdue right to a delivery locker, a return processing instruction is created and transmitted to other authentication server devices 410 and 420. As a result, the return processing instruction for the right to the delivery locker is shared by all authentication server devices 400, 410, and 420.

Next, authentication server devices 400, 410, and 420 store the shared, return processing instruction into process storage unit 401 (Step S404).

Next, all authentication server devices 400, 410, and 420 check the signature included in the received return processing instruction and form an agreement (Step S405). Subsequently, all authentication server devices 400, 410, and 420 create a block of the blockchain that includes the shared return processing instruction (Step S406). The created block is stored into block storage unit 406.

At the end, each of all authentication server devices 400, 410, and 420 updates the right holder information stored in right holder information storage unit 405 (Step S407) to change the current right holder included in the right holder information from the user to the assignor, i.e., the original right holder.

1.7 Advantageous Effects of Embodiment 1

As described above, management system 10 according to the present embodiment manages the condition for assignment such as an expiration limit along with an assignee when a right such as the right of use is assigned, and thus is capable of automatically returning the right to the original light holder when the condition for assignment is no longer met such as when the expiration limit has passed. This makes it possible to prevent improper use of a locker device including one or more storage units.

More specifically, a user sets a condition for assignment such as an expiration limit upon assignment of the right to another user. Note that in the case where the right is managed using the smart contract of the blockchain, unauthorized use by a user cannot be prevented without measures because the right is not automatically returned to the original right holder even when the condition for assignment such as the expiration limit is no longer met. Therefore, in management system 10, the authentication server device checks whether there is any right to a locker that fails to meet the condition for assignment among the rights to all the lockers, and executes the process of returning, to the original right holder, the right to the locker that fails to meet the condition for assignment. Thus, it is possible to prevent improper use such as continued use without authorization resulting from not returning the right by a malicious user and the state of a locker being unusable for a long period of time resulting from a situation in which an innocent user leaves an object stored in the locker, for example.

In this manner, it is possible to provide a management system which safely manages the right to use a delivery locker and prevents improper use such as unauthorized use of a delivery locker by a user or the like.

OTHER VARIATIONS

Although the present disclosure has been described based on the above embodiment, it goes without saying that the present disclosure is not limited to the above embodiment. Variations 1 to 8 described below are also included in the present disclosure.

Variation 1

In the above embodiment, delivery locker device 300 is described as merely receiving an instruction from delivery locker control device 200 and executing the instruction, but this is not limiting. The delivery locker device may include a sensor and transmit, to the delivery locker control device, the condition of the inside of a delivery locker and/or the open or closed status of a door, for example.

Figure 17:
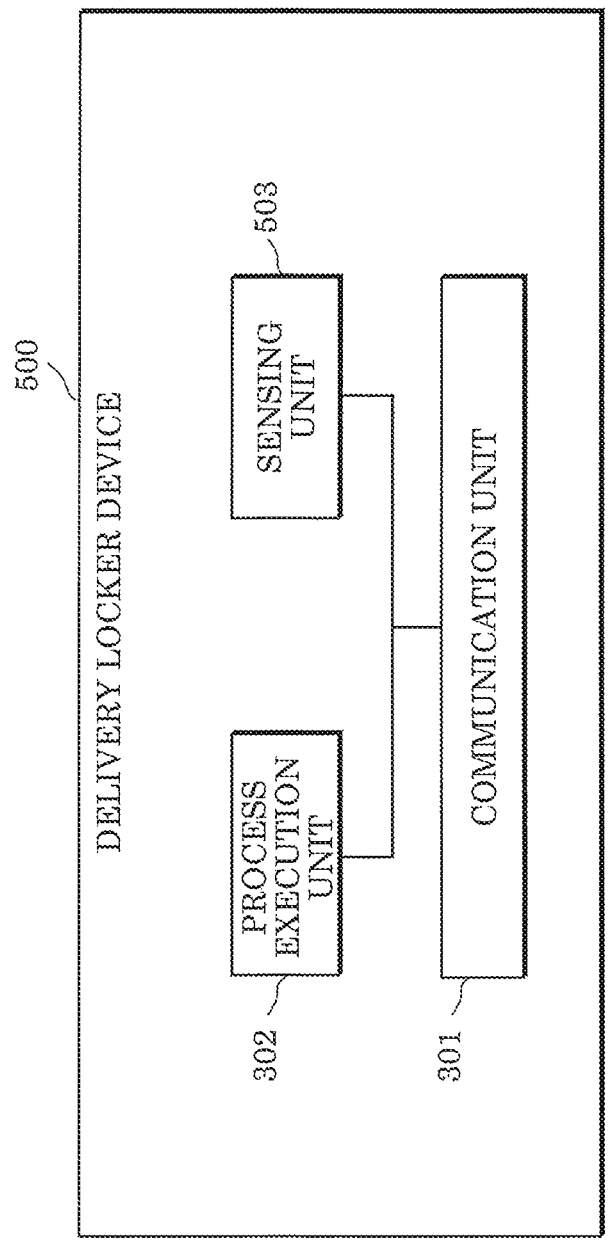
FIG. 17 is a configuration diagram illustrating an example of the detailed configuration of a delivery locker device according to Variation 1.

FIG. 17 is a configuration diagram illustrating an example of the detailed configuration of delivery locker device 500 according to Variation 1.

Delivery locker device 500 includes communication unit 301, process execution unit 302, and sensing unit 503. Elements that are substantially the same as those in FIG. 8 share the same reference numerals, and detailed description thereof will be omitted.

Delivery locker device 500 according to Variation 1 is different in structure from delivery locker device 300 illustrated in FIG. 8 in that sensing unit 503 is additionally included.

Sensing unit 503 is capable of sensing the open or closed status of a door and/or the condition of the inside of a delivery locker which accommodates a tangible object in a physical space and includes a lock that is locked and unlocked by an electronic process.

With this, by sensing the presence or absence of a package inside a target delivery locker using sensing unit 503, for example, delivery locker device 500 can determine whether the target delivery locker is in use. Furthermore, by sensing the open or closed status of the door of a target delivery locker using sensing unit 503, delivery locker device 500 can check whether the unlocking instruction transmitted by delivery locker control device 200 has been successfully executed.

Variation 2

In the above embodiment, predetermined one authentication server device 400 determines whether the condition for assignment of the right to a locker is met, but this is not limiting. All authentication server devices 400, 410, and 420 may perform the processes in Step S401 and S402 illustrated in FIG. 16 to determine whether the condition for assignment is met.

Variation 3

In the above embodiment, authentication server device 400 regularly determines whether the condition for assignment of the right to a locker is met, but this is not limiting. Before any of the right exercise process, the right returning process, and the right assignment process, a user may send a request for update of the right holder of a target delivery locker to one of the authentication server devices, and the authentication server device that has received the request may determine whether the condition for assignment is met.

Figure 18:
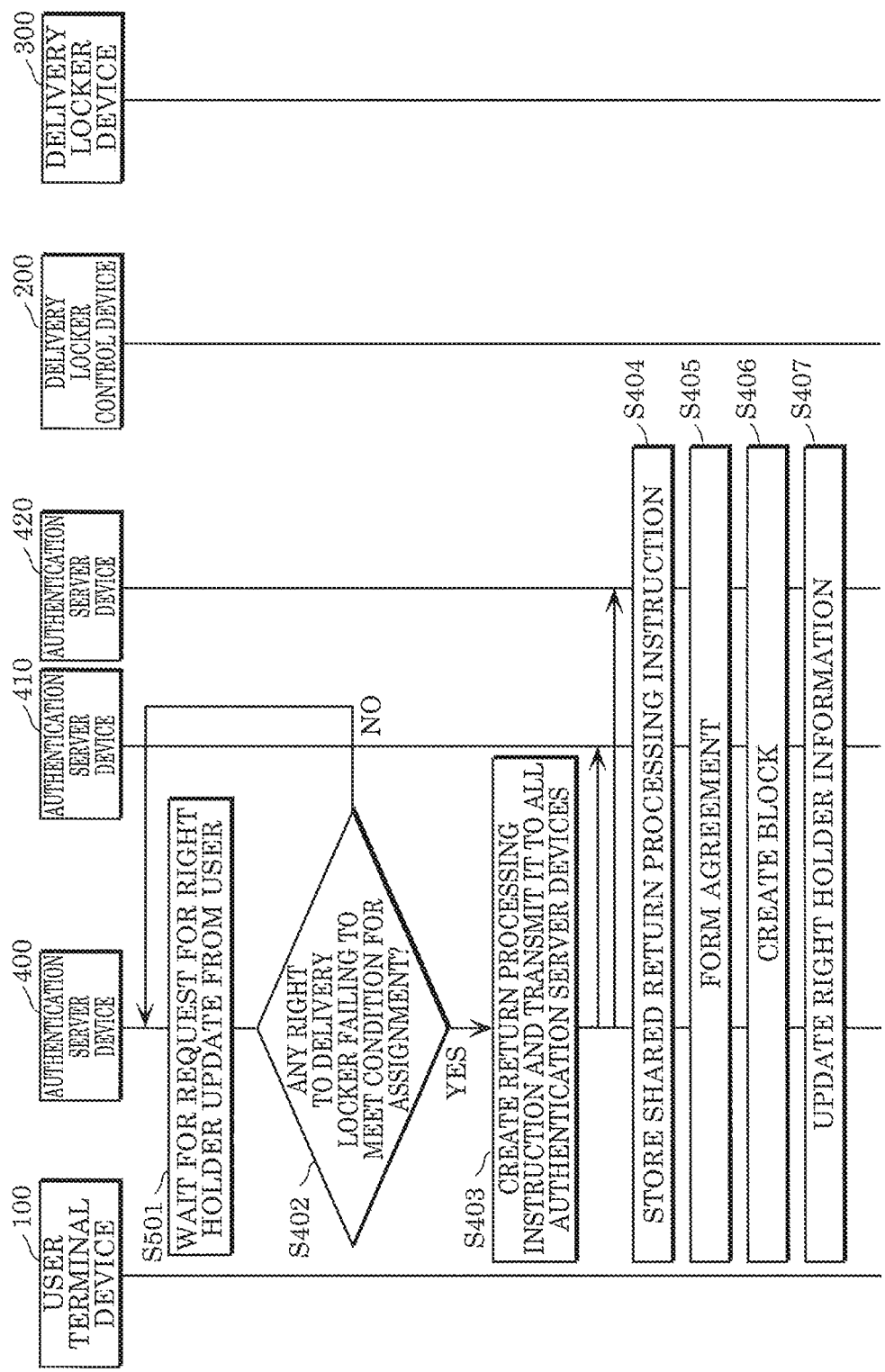
FIG. 18 is a sequence chart illustrating an example of an operation in an assignment condition check phase according to Variation 3.

FIG. 18 is a sequence chart illustrating an example of the operation in the assignment condition check phase according to Variation 3. Elements that are substantially the same as those in FIG. 16 share the same reference numerals, and detailed description thereof will be omitted.

First, authentication server devices 400, 410, and 420 wait for a request for a right holder update from a user (Step S501) because determination of whether the condition for assignment is met is made in response: to a request for right holder update transmitted from a user. In the present variation, suppose that a user transmits a request for right holder update to authentication server devices 400, 410, and 420 before Step S101 illustrated in FIG. 13, before Step S201 illustrated in FIG. 14, before Step S301 illustrated in FIG. 15, or before Step S301 illustrated in. FIG. 15, or at the same time as inquiring in Step S301. And suppose that authentication server device 400 receives the request for right holder update from the user.

Next, in Step S402, authentication server device 400 determines whether there is any right to a delivery locker that fails to meet the condition for assignment among the rights to all the delivery lockers (Step S402). For example, in the case where the condition for assignment is an expiration limit, authentication server device 400 obtains the current time and determines whether there is any overdue right to a delivery locker among the rights to all the delivery lockers. The subsequent flow is as described in the above embodiment and thus, description thereof will be omitted.

In this manner, in the present variation, user terminal device 100 further transmits a right holder update request which is a request for update of the right holder information, and condition checking unit 404 further receives the right holder update request and then checks whether the condition for assignment is met.

This allows authentication server device 400 to determine whether the condition for assignment is met, at the timing of transmission of the processing instruction from user terminal device 100, and thus the determination can be made earlier than in the case where the determination is made at the predetermined interval. As a result, since authentication server device 400 can determine more frequently with appropriate timing whether the condition for assignment is met, it is possible to shorten the period of improper use.

Variation 4

In the above embodiment, authentication server device 400 determines whether the condition for assignment of the right to a locker is met, but this is not limiting. The delivery locker control device may determine whether the condition for assignment is met.

Figure 19:
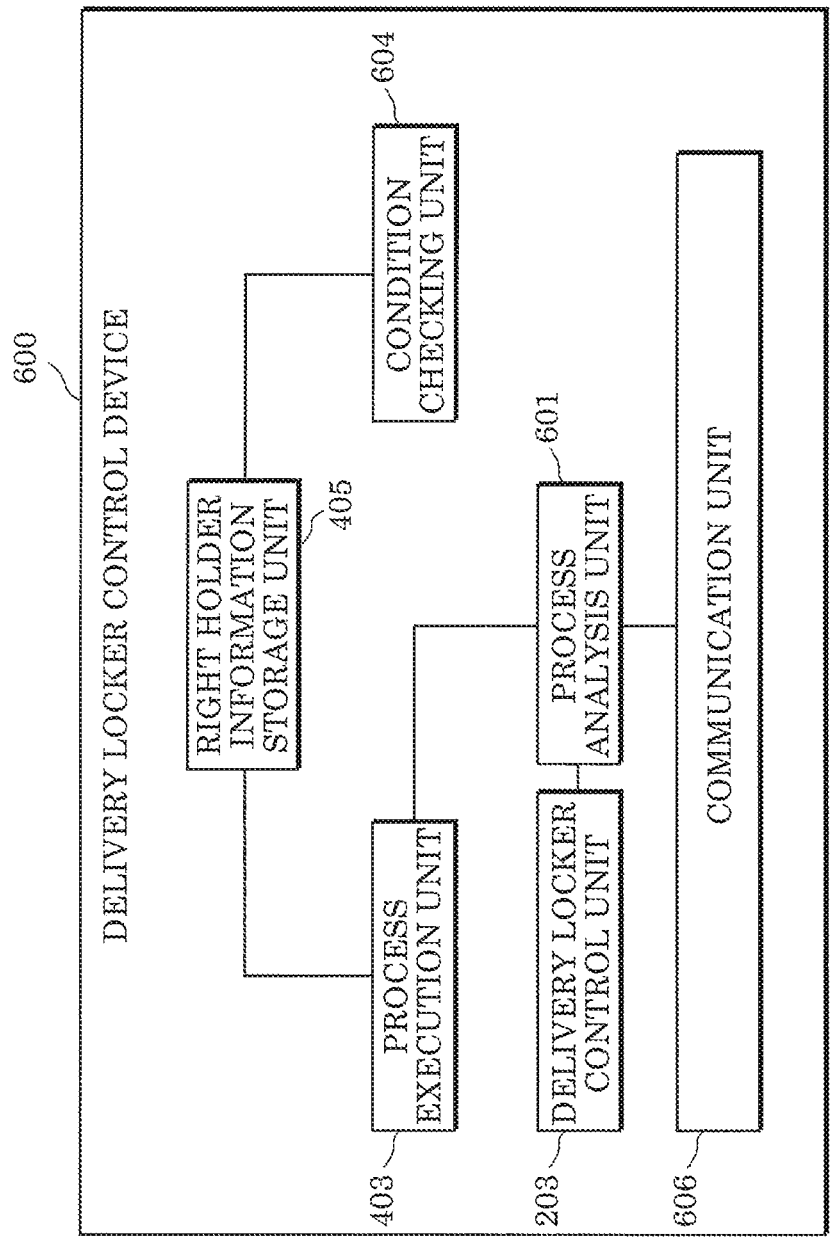
FIG. 19 is a configuration diagram illustrating an example of the detailed configuration of a delivery locker control device according to Variation 4.

FIG. 19 is a configuration diagram illustrating an example of the detailed configuration of delivery locker control device 600 according to Variation 4. Elements that are substantially the same as those in FIG. 7 and FIG. 9 share the same reference numerals, and detailed description thereof will be omitted.

In delivery locker control device 600 according to Variation 4, as compared to delivery locker control device 200 illustrated in FIG. 7, process execution unit 403, right holder information storage unit 405, and condition checking unit 604 are additionally included, and process analysis unit 601 has a different structure.

Communication unit 606 is implemented using a processor, a communication interface, and the like and receives the right exercise instruction transmitted from user terminal devices 100 and 110 to authentication server devices 700, 710, and 720. Communication unit 606 transmits the received right exercise instruction to process analysis unit 601. In Variation 4, communication unit 606 receives a block created as a result of agreement formation by authentication server devices 700, 710, and 720 according to Variation 4, and transmits the received block to process analysis unit 601.

Process analysis unit 601 receives the block transmitted from communication unit 606. Process analysis unit 601 analyzes the processing instruction included in the received block and retrieves the processing instruction. At this time, delivery locker control device 600 may retrieve only the processing instruction for the delivery locker to be controlled by delivery locker control device 600 itself. Process analysis unit 601 transmits the retrieved processing instruction to process execution unit 403 and delivery locker control unit 203. The other features are substantially the same as those of process analysis unit 202 according to the embodiment and thus, description thereof will be omitted.

Condition checking unit 604 checks at the predetermined interval whether the condition for assignment is met. When determining that the condition for assignment fails to be met, condition checking unit 604 creates a return processing instruction for returning the right, and transmits the return processing instruction to at least one of authentication server devices 700, 710, and 720. The other features are substantially the same as those of condition checking unit 404 according to the embodiment and thus, description thereof will be omitted.

Figure 20:
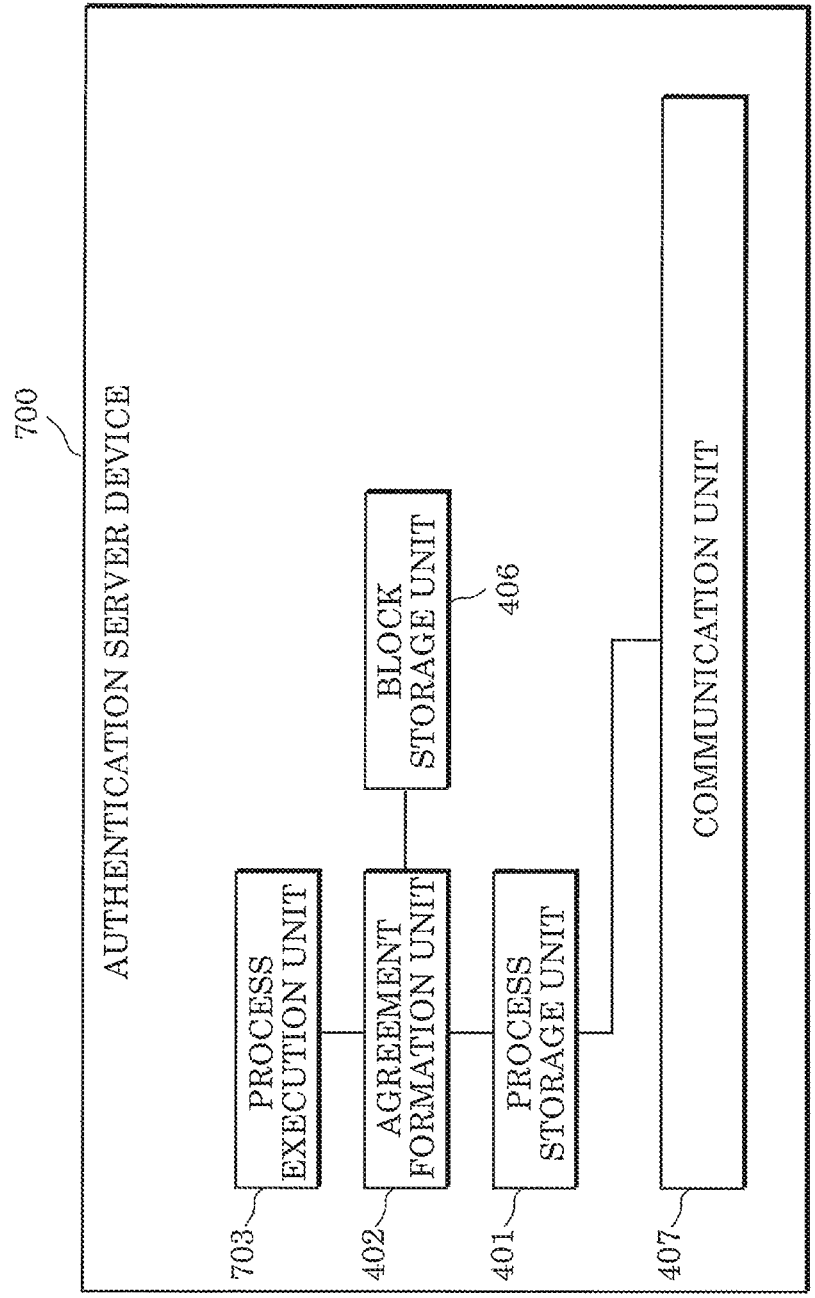
FIG. 20 is a configuration diagram illustrating an example of the detailed configuration of an authentication server device according to Variation 4.

FIG. 20 is a configuration diagram illustrating an example of the detailed configuration of authentication server device 700 according to Variation 4. Note that elements that are substantially the same as those in FIG. 9 share the same reference numerals, and detailed description thereof will be omitted. Furthermore, authentication server devices 710 and 720 have the same configuration as authentication server device 700 and thus, description of authentication server devices 710 and 720 will be omitted.

In authentication server device 700 according to Variation 4, as compared to authentication server device 400 illustrated in FIG. 9, right holder information storage unit 405 and condition checking unit 404 are not included, and process execution unit 703 has a different structure.

When the processing instruction transmitted from agreement formation unit 402 is an assignment processing instruction included in the block created by agreement formation unit 402, process execution unit 703 obtains the created block from block storage unit 406 and transmits the created block to delivery locker control device 600. When the processing instruction transmitted from agreement formation unit 402 is a return processing instruction included in the block created by agreement formation unit 402, process execution unit 703 obtains the created block from block storage unit 406 and transmits the created block to delivery locker control device 600.

Next, the operation of management system 10 according to the present variation configured as described above will be described. Hereinafter, the right assignment phase and the assignment condition check phase will be described with reference to the drawings.

Figure 21:
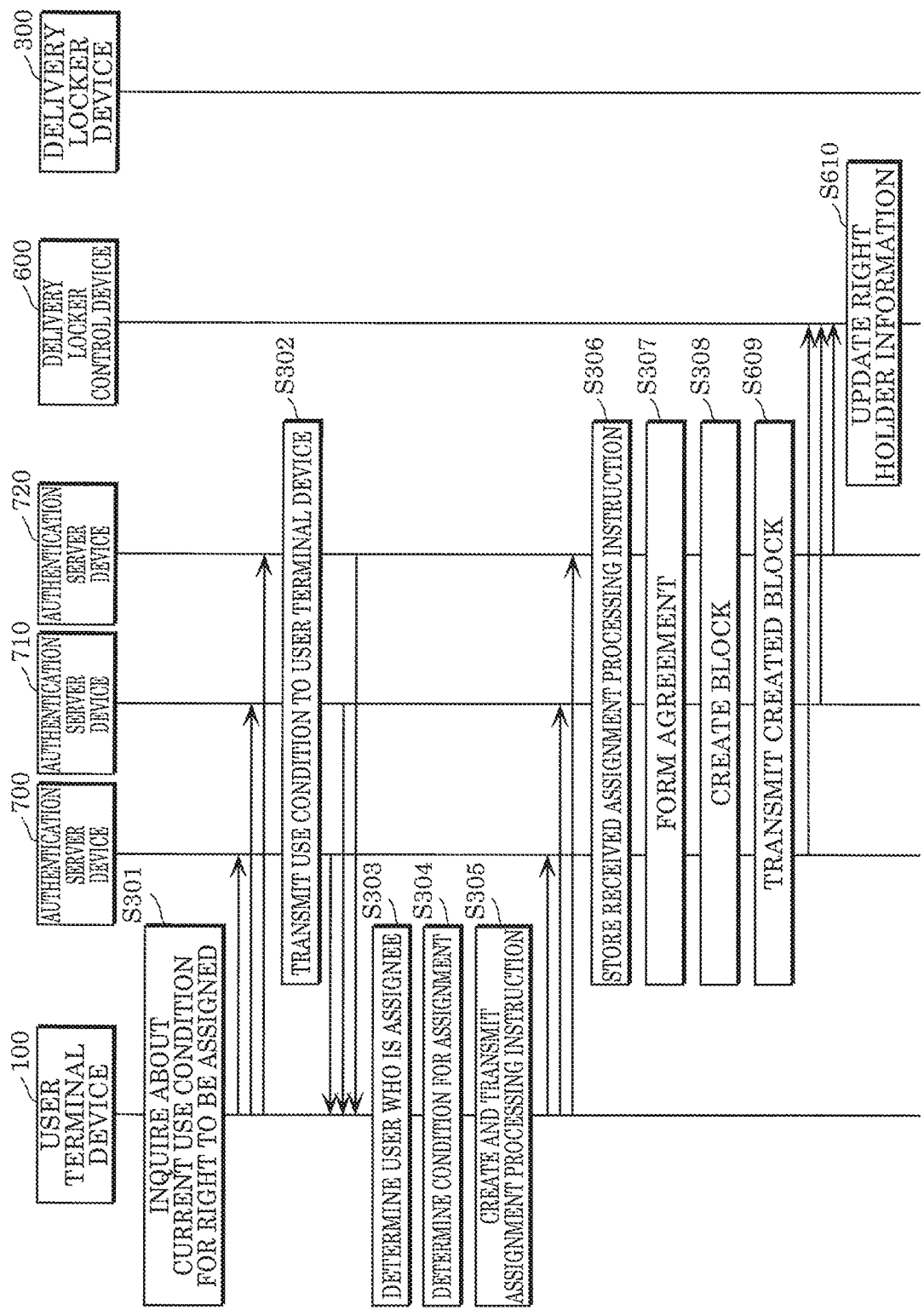
FIG. 21 is a sequence chart illustrating an example of an operation in a right assignment phase according to Variation 4.

FIG. 21 is a sequence chart illustrating an example of the operation in the right assignment phase according to Variation 4. Elements that are substantially the same as those in FIG. 15 share the same reference numerals, and detailed description thereof will be omitted. Specifically, description of Steps S301 to S308 will be omitted.

In Step S609, at least one of authentication server devices 700, 710, and 720 transmits the created block to delivery locker control device 600.

Next, delivery locker control device 600 updates, according to the assignment processing instruction which is the processing instruction included in the received block, the right holder information stored in right holder information storage unit 405 (Step S610) to change the current right holder included in the right holder information to the user to whom the right is assigned.

Figure 22:
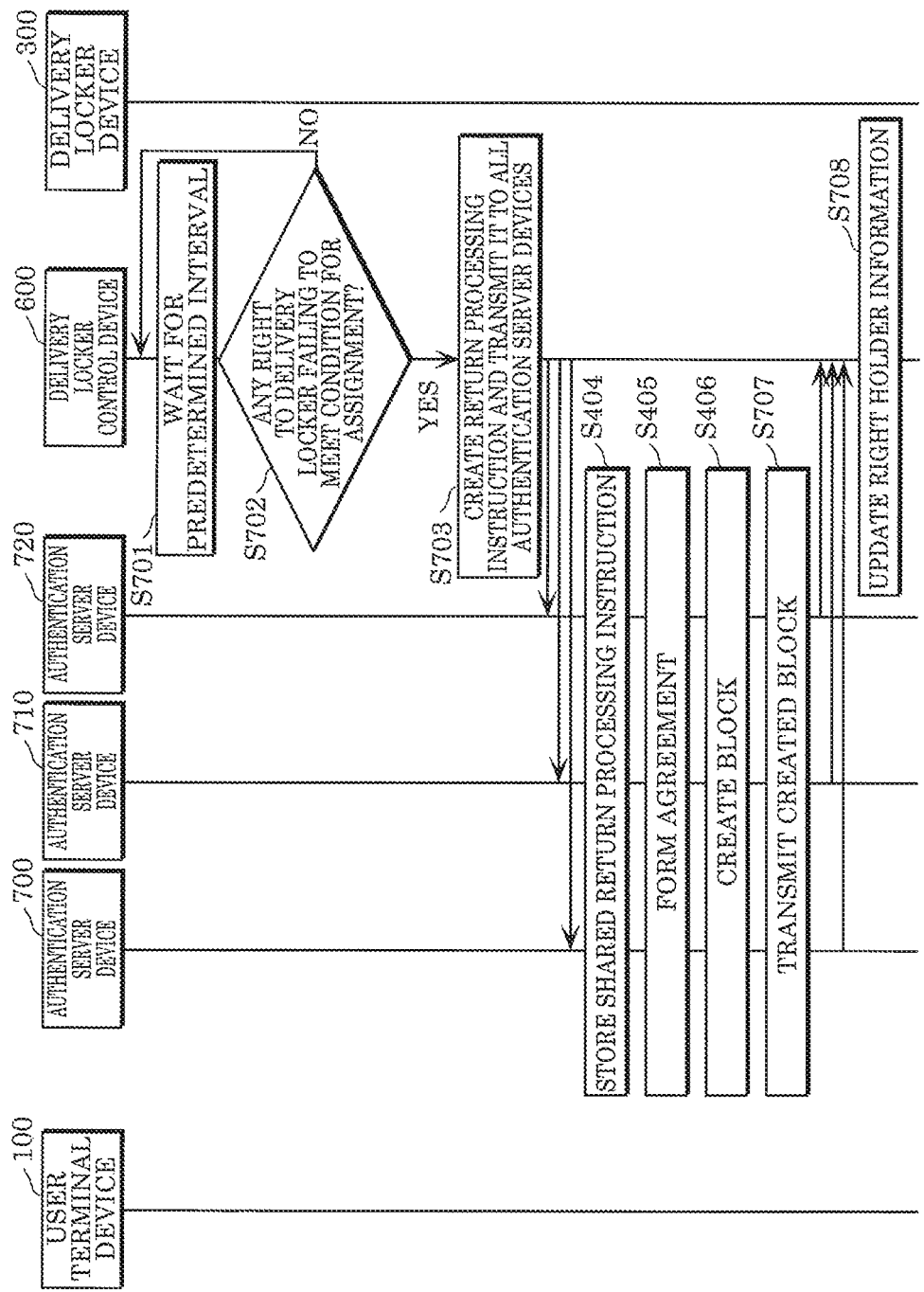
FIG. 22 is a sequence chart illustrating an example of an operation in an assignment condition check phase according to Variation 4.

FIG. 22 is a sequence chart illustrating an example of the operation in the assignment condition check phase according to Variation 4. Elements that are substantially the same as those in FIG. 16 share the same reference numerals, and detailed description thereof will be omitted.

First, delivery locker control device 600 waits for the predetermined interval (Step S701) because delivery locker control device 600 determines at, the predetermined intervals whether the condition for assignment is met.

Next, after the lapse of the predetermined interval, delivery locker control device 600 determines whether there is any right to a delivery locker that fails to meet the condition for assignment among the rights to all the delivery lockers (Step S702).

When none of the rights to the delivery lockers fails to meet the condition for assignment in Step S702 (NO in Step S702), the processing returns to Step S701, which means another wait for the predetermined interval. On the other hand, when there is a right to a delivery locker that fails to meet the condition for assignment in Step S702 (YES in Step S702), a return processing instruction is created for the right to the delivery locker, and transmitted to all authentication server devices 700, 10, and 720 (Step S703).

Note that description of Steps S401 to S407 will be omitted.

In Step S707, at least one of authentication server devices 700, 710, and 720 transmits the created block to delivery locker control device 600.

At the end, delivery locker control device 600 updates, according to the return processing instruction which is the processing instruction included in the received block, the right holder information stored in right holder information storage unit 405 (Step S708). Note that the right holder information is updated to change the current right holder included in the right holder information from the user to the assignee, i.e., the original right holder.

Variation 5

In the above embodiment, authentication server device 400 determines (checks) at the predetermined interval whether the condition for assignment of the right to a locker is met, but this is not limiting. In synchronization with a failure to meet the condition for assignment of the right to a delivery locker, authentication server device 400 may perform interrupt processing for returning the right.

Variation 6

In the above embodiment, authentication server devices 400, 410, and 420 are described as sharing the return processing instruction and then updating the right holder information when there is a right to a delivery locker that fails to meet the condition for assignment, but this is not limiting. Hereinafter, the operation in the assignment condition check phase according to Variation 6 will be described.

FIG. 23 is a sequence chart illustrating the operation in the assignment condition check phase according to Variation 6.

First, authentication server devices 400, 410, and 420 wait for the predetermined interval (Step S801) because authentication server devices 400, 410, and 420 determine at the predetermined interval whether the condition for assignment is met.

Next, after the lapse of the predetermined interval, authentication server devices 400, 410, and 420 determine whether there is any right to a delivery locker that fails to meet the condition for assignment among the rights to all the delivery lockers (Step S802).

When none of the rights to the delivery lockers fails to meet the condition for assignment in Step S802 (NO in Step S802), the processing returns to Step S801, which means another wait for the predetermined interval. On the other hand, when there is a right to a delivery locker that fails to meet the condition for assignment in Step S802 (YES in Step S802), each of authentication server devices 400, 410, and 420 updates the right holder information stored in right holder information storage unit 405 (Step S803). As a result, the right holder information is updated to change the current right holder included in the right holder information to the original right holder.

In this manner, without forming an agreement, authentication server devices 400, 410, and 420 may update the right holder information stored in right holder information storage unit 405. This can be applied when the proof that the condition for assignment is no longer met does not need to be written or accumulated on the blockchain.

Variation 7

In the above embodiment, when the condition for assignment of the right to a delivery locker is no longer met, only the process of returning the right is performed, but the following operation may additionally be performed.

Specifically, the authentication server device adds one point to a user who has the right at the time of failing to meet the condition for assignment. The user having this point is subject to restrictions such as not being allowed to use a delivery locker for a predetermined period. In this case, stricter restrictions may be imposed with the total of points or the restrictions may be imposed at the time when the user earns a predetermined amount of points.

Variation 8

In the case where the condition for assignment is an expiration limit or the like, the expiration limit or the like may be extended upon application by a user.

Variation 9

In the above embodiment and variations, management system 10 is described as managing the condition for assignment such as an expiration limit along with an assignee when a right such as the right of use is assigned, and automatically returning the right to the original right holder when the condition for assignment is no longer met such as when the expiration limit has passed, but this is not limiting.

For example, when an assignee returns the right to the original right holder earlier than the expiration limit, management system 10 may issue a token, which is a reward, to the assignee.

Here, when an assignee returns the right to the original right holder earlier than the expiration limit, management system 10 may issue, to the assignee, a token the value of which depends on the length of time or period left until the expiration limit. The original right holder may determine the value of a token that is issued per day in the case where there are a few days left until the expiration limit, or may determine the value of a token that is issued per hour in the case where there are a few hours left until the expiration limit. In addition, together with the expiration limit, the total number of uses, or the total number of permitted reassignment, the value of the token to be issued when the right is returned earlier than the expiration limit may be included in the condition for assignment. With this, it is possible to write, on the blockchain, the condition about the value of the token to be issued when the right is returned earlier than the expiration limit.

Note that when an assignee returns the right earlier than the expiration limit, management system 10 may issue a predetermined token to the assignee regardless of the length of time or period until the expiration limit.

Variation 10

In the above embodiment and variations, management system 10 is described as managing the condition for assignment such as an expiration limit along with an assignee when a right such as the right of use is assigned, and automatically returning the right to the original right holder when the condition for assignment is no longer met such as when the expiration limit has passed, but this is not limiting.

For example, payment of a token by an assignee to the original right holder may make it possible to extend the expiration limit included in the condition for assignment. The assignee who wishes to extend the expiration limit may voluntarily pay a token to the original right holder to extend the expiration limit. Alternatively, when notified that today is the date of the expiration limit or that the expiration limit is approaching, the assignee may pay a token to the original right holder to extend the expiration limit.

Variation 11

In the above embodiment and variations, management system 10 is described as managing the right to the delivery locker device using the blockchain to prevent improper use of the locker, but this is not limiting. Management system 10 may manage, using the blockchain, the right to another device such as a shared bike, to prevent improper use thereof. This means that the management system, etc., according to the present disclosure may be applied to another device such as a shared bike to prevent improper use of the device.

OTHER IMPLEMENTATION POSSIBILITIES

The management system, etc., according to the present disclosure have hereinbefore been described in the embodiment, but the subject, device, or the like which performs each processing is not particularly limited. The processing may be performed by a processor or the like (to be described below) embedded in a specific device installed in a local network. Alternatively, the processing may be performed by a cloud server or the like installed in a location different from a device installed in a local network.

Note that the present disclosure is not limited to the above embodiment. For example, other embodiments resulting from arbitrary combinations of structural elements described in the present specification or resulting from removing some of the structural elements described in the present specification may be embodiments of the present disclosure. Furthermore, variations obtainable through various changes to the above embodiment that can be conceived by a person having ordinary skill in the art without departing from the essence of the present disclosure, that is, the meaning of the recitations in the claims are included in the present disclosure.

Furthermore, the following cases are also included in the present disclosure.

(1) The preceding devices are a computer system configured from, specifically, a microprocessor, a read only memory (ROM), a random access memory (RAM), a hard disk unit, a display unit, a keyboard, and a mouse, for example. A computer program is stored in the RAM Or the hard disk unit. Each device achieves its function as a result of the microprocessor operating according to the computer program. Here, the computer program is configured of a plurality of pieced together instruction codes indicating a command to the computer in order to achieve a given function.

(2) A portion or all of the structural elements of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) A portion or all of the structural elements of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

(4) The present disclosure may be a method shown above. Moreover, the present disclosure may also be a computer program implementing these methods with a computer, or a digital signal of the computer program.

(5) Moreover, the present disclosure may also be implemented as the computer program or the digital signal recorded on recording media readable by a computer, such as a flexible disk, hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on the aforementioned recoding media.

Furthermore, the present disclosure may be the aforementioned computer program or the aforementioned digital signal transmitted via an electrical communication line, a wireless or wired, communication line, a network represented by the Internet, data broadcasting, or the like.

Furthermore, the present disclosure may be a computer system including a microprocessor and a memory. The memory may store the aforementioned computer program and the microprocessor may operate according to the computer program.

Moreover, by transferring the aforementioned recording medium having the aforementioned program or digital signal recorded thereon or by transferring the aforementioned program or digital signal via the aforementioned network, or the like, the present disclosure may be implemented by a different independent computer system.

Although the present invention has been described and illustrated in detail, it is clearly understood that the same is by way of example only and is not to be taken by way of limitation, the scope of the present invention being limited only by the terms of the appended claims.

INDUSTRIAL APPLICABILITY

The present disclosure is applicable to a management system, a server, a management method, and a recording medium by wish the right to use a delivery locker is safely managed and improper use such as unauthorized use of a delivery locker by a user or the like is prevented.

What is claimed is:

1. A management system, comprising:
a right holder information storage unit configured to store right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing;
an agreement for unit configured to create a block of a blockchain and store the block into a block storage unit, the block including a processing instruction;
a terminal device which transmits, as one kind of the processing instruction, an assignment processing instruction including a condition for assignment of the right and user information indicating a second user to whom the right is assigned;
a process execution unit configured to, when obtaining the assignment processing instruction as one kind of the processing instruction included in the block, update a current right holder included in the right holder information from the first user to the second user; and
a condition checking unit configured to check whether the condition for assignment is met, and when determining that the condition for assignment fails to be met, create a return processing instruction for returning the right from the second user to the first user, and transmit the return processing instruction to the agreement formation unit, wherein
the process execution unit is configured to, when obtaining the return processing instruction as one kind of the processing instruction included in the block, update the second user included in the right holder information to the first user.

2. The management system according to claim 1, wherein the condition for assignment is one of an expiration limit, a total number of uses, and a total number of permitted reassignment.

3. The management system according to claim 2, further comprising:
the terminal device;
the locker device; and
a server device, wherein
the server device includes the right holder information storage unit, the agreement formation, unit, the process execution unit, and the condition checking unit, and
the condition checking unit is configured to check, at a predetermined interval, whether the condition for assignment is met.

4. The management system according to claim 2, further comprising:
the terminal device;
the locker device;
a server device; and
a locker control device which controls the locker device, wherein
the server device includes the agreement formation unit,
the locker control device includes the right holder information storage unit, the process execution unit, and the condition checking unit, and
the condition checking unit is configured to check, at a predetermined interval, whether the condition for assignment is met.

5. The management system according to claim 1, wherein the condition for assignment is set by being input to the terminal device.

6. The management system according to claim 1, wherein the terminal device further transmits a request for update of the right holder information, and
the condition checking unit is further configured to, when receiving the request for update, check whether the condition for assignment is met.

7. A server, comprising:
a right holder information storage unit configured to store right holder information about a right to one locker in a locker device, the right holder information including a first user who is a right holder entitled to use the one locker, the locker device including, one or more lockers each of which accommodates a tangible object in a physical space and includes a lock that is locked and unlocked by electronic processing;
an agreement formation unit configured to create a block of a blockchain and store the block into a block storage unit, the block including a processing instruction;
a process execution, unit configured to, when obtaining an assignment processing instruction as one kind of the processing instruction included in the block, update a current right holder included in the right holder information from the first user to a second user to whom, the right, is assigned, the assignment processing instruction including a condition for assignment of the right and user information indicating the second user; and
a condition checking unit configured to check whether the condition for assignment is met, and when determining that the condition for assignment fails to be met, create a return processing instruction for returning the right from the second user to the first user, and transmit the return processing instruction to the agreement formation unit, wherein
the process execution unit is configured to, when obtaining the return processing instruction as one kind of the processing instruction included in the block, update the second user included in the right holder information to the first user.

8. A management method, comprising:
storing right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing;
forming an agreement by creating a block of a blockchain and storing the block into a block storage unit, the block including a processing instruction;
executing a process by, when obtaining an assignment processing instruction as one kind of the processing instruction included in the block, updating a current right holder included in the right holder information from the first user to a second user to whom the right is assigned, the assignment processing instruction including a condition for assignment of the right and user information indicating the second user; and
checking a condition by checking whether the condition for assignment is met, and when determining that the condition for assignment fails to be met, creating a return processing instruction for returning the right from the second user to the first user, and transmitting the return processing instruction to a computer which forms the agreement, wherein
in the executing, when obtaining the return processing instruction as one kind of the processing instruction included in the block, the second user included in the tight bolder information is updated to the first user.

9. A non-transitory computer-readable recording medium which stores a program for causing a computer to execute:
storing right holder information about a right to one locker in a locker device, the right holder information including a first user who is a right holder entitled to use the one locker, the locker device including one or more lockers each of which accommodates a tangible object in a physical space and includes a lock that is locked and unlocked by electronic processing;
forming an agreement by creating a block of a blockchain and storing the block into a block storage unit, the block including a processing instruction;
executing a process by, when obtaining an assignment processing instruction as one kind of the processing instruction included in the block, updating a current right holder included in the right holder information from the first user to a second user to whom the right is assigned, the assignment processing instruction including a condition for assignment of the right and user information indicating the second user; and
checking a condition by checking whether the condition for assignment is met, and when determining that the condition for assignment fails to be met, creating a return processing instruction for returning the right from the second user to the first user, and transmitting the return processing instruction to the computer which forms the agreement, wherein
in the executing, when obtaining the return processing instruction as one kind of the processing instruction included in the block, the second user included in the right holder information is updated to the first user.

\* \* \* \* \*